United States Patent
Tanaka et al.

(10) Patent No.: US 6,341,005 B1
(45) Date of Patent: Jan. 22, 2002

(54) METHOD FOR PRODUCING LIQUID CRYSTAL DEVICE WITH CONDUCTORS ARRANGED IN A MATRIX

(75) Inventors: Chihiro Tanaka, Shimosuwa-machi; Mutsumi Matsuo, Misato-mura; Yoshio Yokouchi, Minoru-machi; Takeyoshi Ushiki, Shiojiri, all of (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/202,097

(22) PCT Filed: Apr. 9, 1998

(86) PCT No.: PCT/JP98/01628

§ 371 Date: Dec. 9, 1998

§ 102(e) Date: Dec. 9, 1998

(87) PCT Pub. No.: WO98/45752

PCT Pub. Date: Oct. 15, 1998

(30) Foreign Application Priority Data

Apr. 9, 1997 (JP) .............................................. 9-091198

(51) Int. Cl.[7] ...................... G02F 1/1343; G02F 1/1345
(52) U.S. Cl. ......................................... 349/149; 349/139
(58) Field of Search ................................ 349/149, 139, 349/138, 51, 52

(56) References Cited

U.S. PATENT DOCUMENTS 5,866,301 A * 2/1999 Ide et al. .................... 430/312
5,889,573 A * 3/1999 Yamamoto et al. ......... 349/152

FOREIGN PATENT DOCUMENTS

| JP | 58-389222 | * | 3/1983 |
| JP | A-58-38922 |  | 3/1983 |
| JP | 1-55539 | * | 3/1989 |
| JP | A-64-55539 |  | 3/1989 |
| JP | A-5-119356 |  | 5/1993 |
| JP | A-5-313200 |  | 11/1993 |

* cited by examiner

Primary Examiner—Kenneth Parker
Assistant Examiner—Mike Qi
(74) Attorney, Agent, or Firm—Oliff & Berridge PLC

(57) ABSTRACT

The energizing patterns (12A) are composed of wiring pattern sections (12A-1) formed so as to be elongated along the region for forming the wiring layers (12), connection pattern sections (12A-2) connecting the adjoining wiring patterns for each pixel region and striped joint pattern sections (12A-3) for connecting the wiring pattern sections (12A-1) outside of the prospective liquid crystal display region in which pixel regions are arranged. Element constituting sections (12A-2a) including the portions to be formed into connection layers (13) are formed in the connection pattern sections (12A-2). The portions to be formed into the connection layers (13) are formed into a protruding peninsula shape in this element constituting sections (12A-2a). The present invention can prevent defective anodic oxidation due to cutting off or imperfect configuration of the energizing pattern (12A), as well as reducing the process damage of the active element.

9 Claims, 18 Drawing Sheets

[FIG. 1]
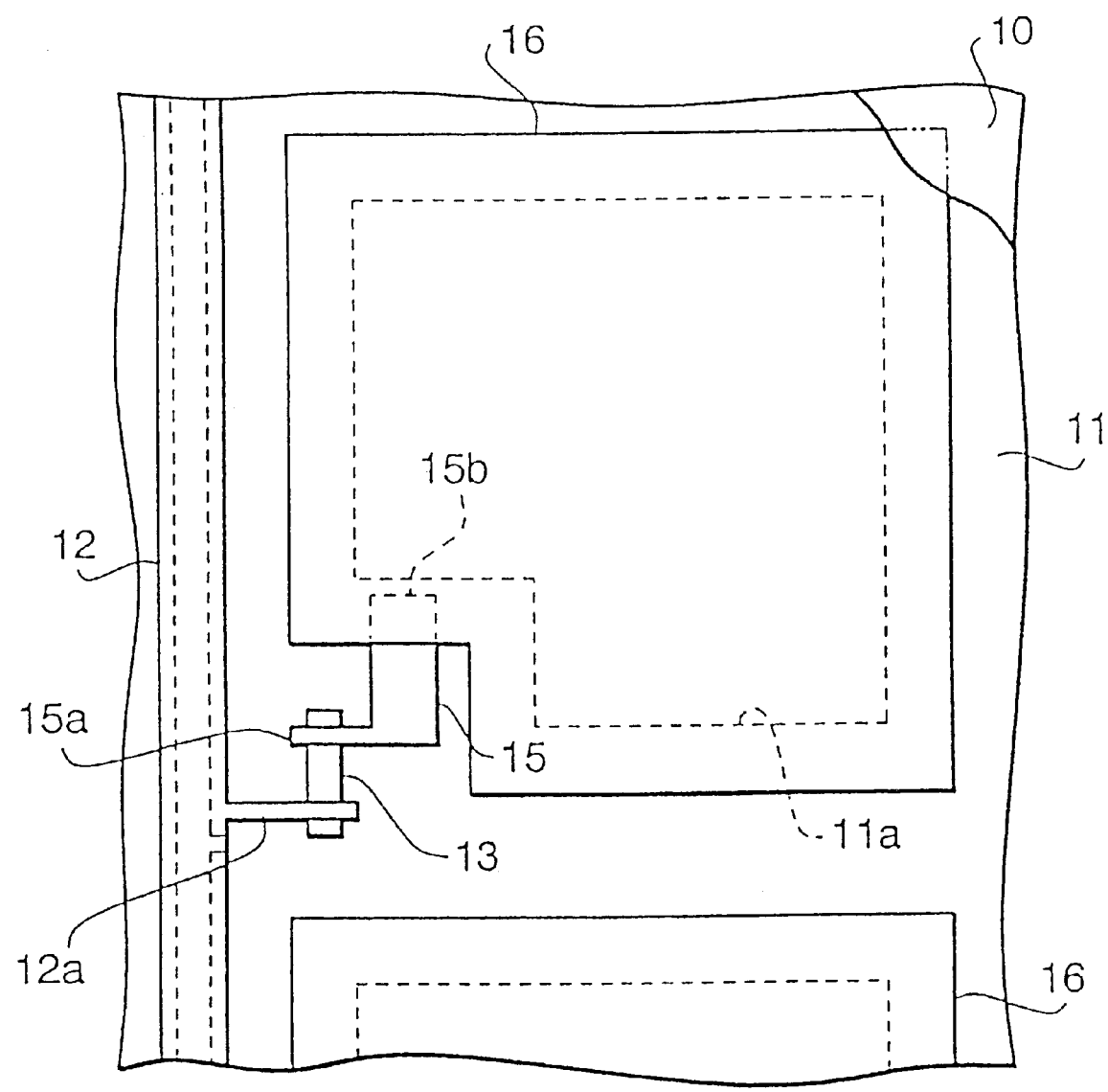

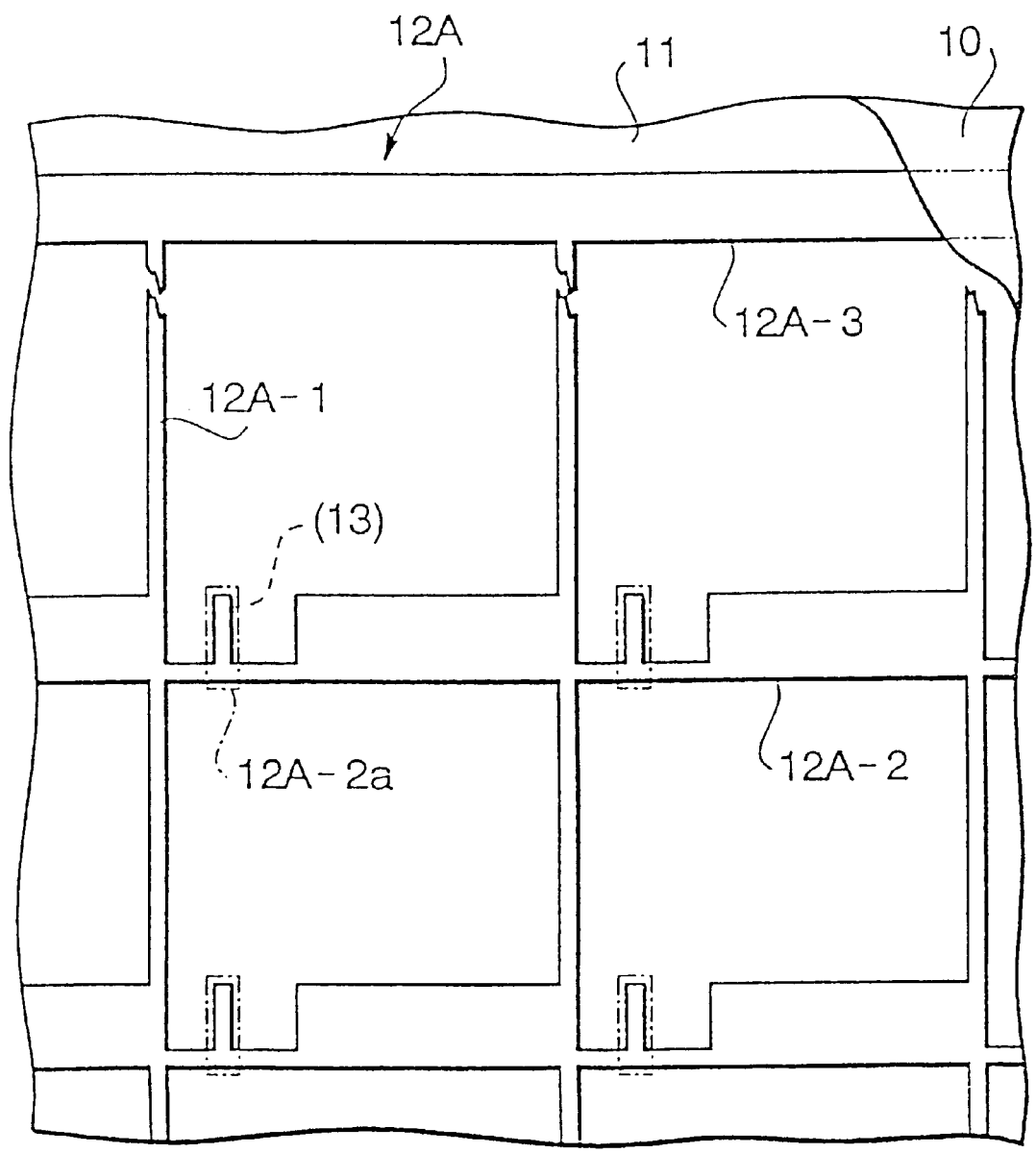
[FIG. 2]

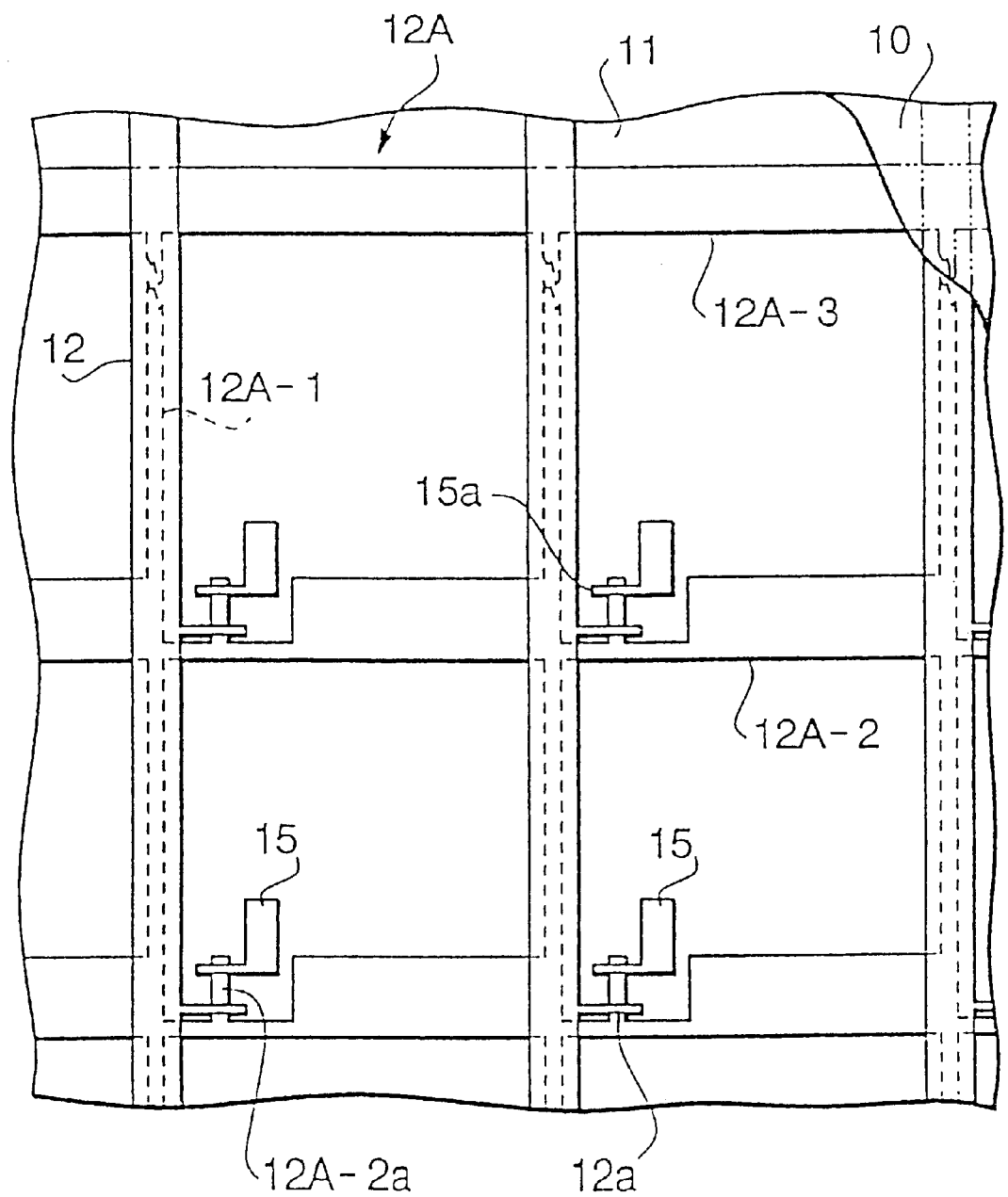
[FIG. 3]

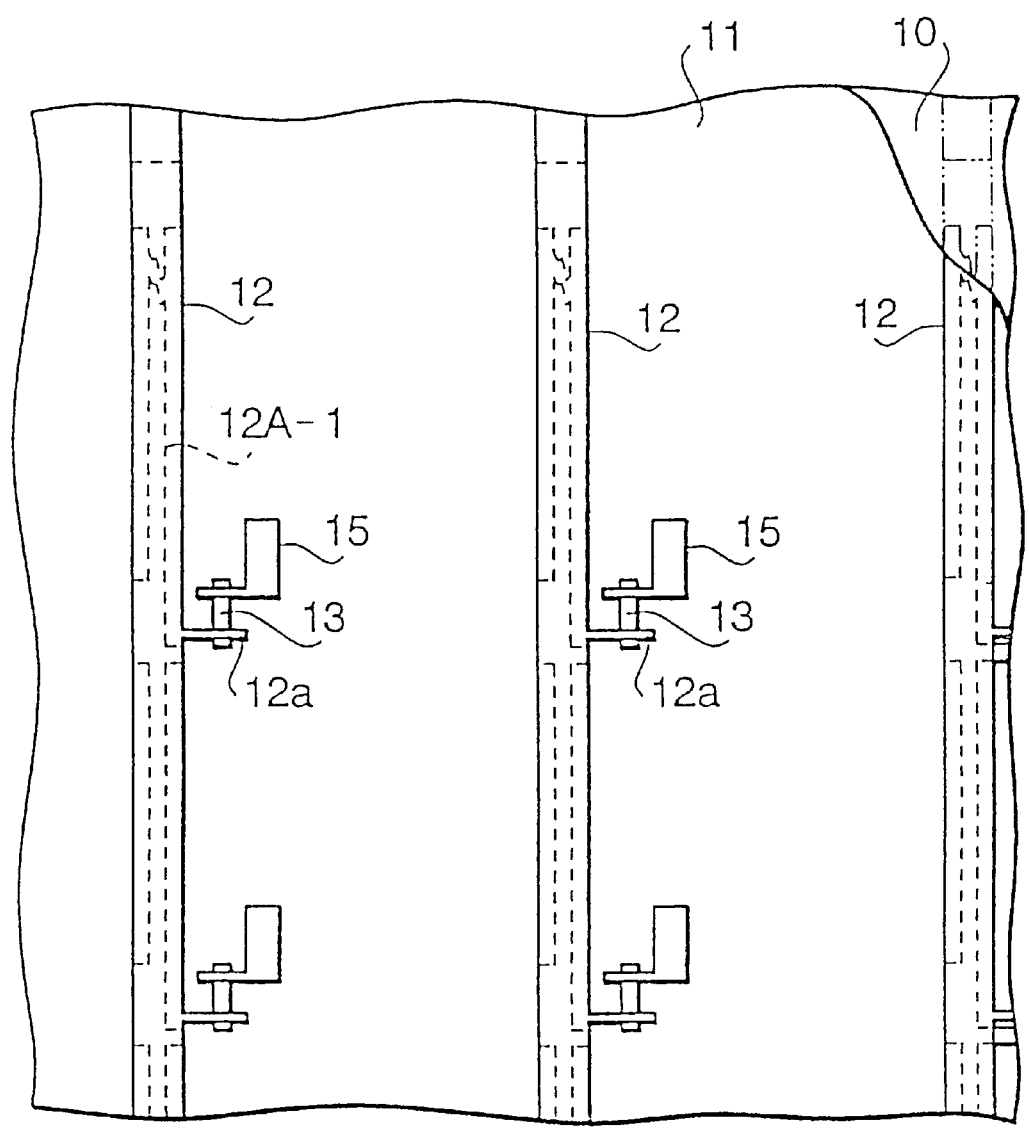
[FIG. 4]

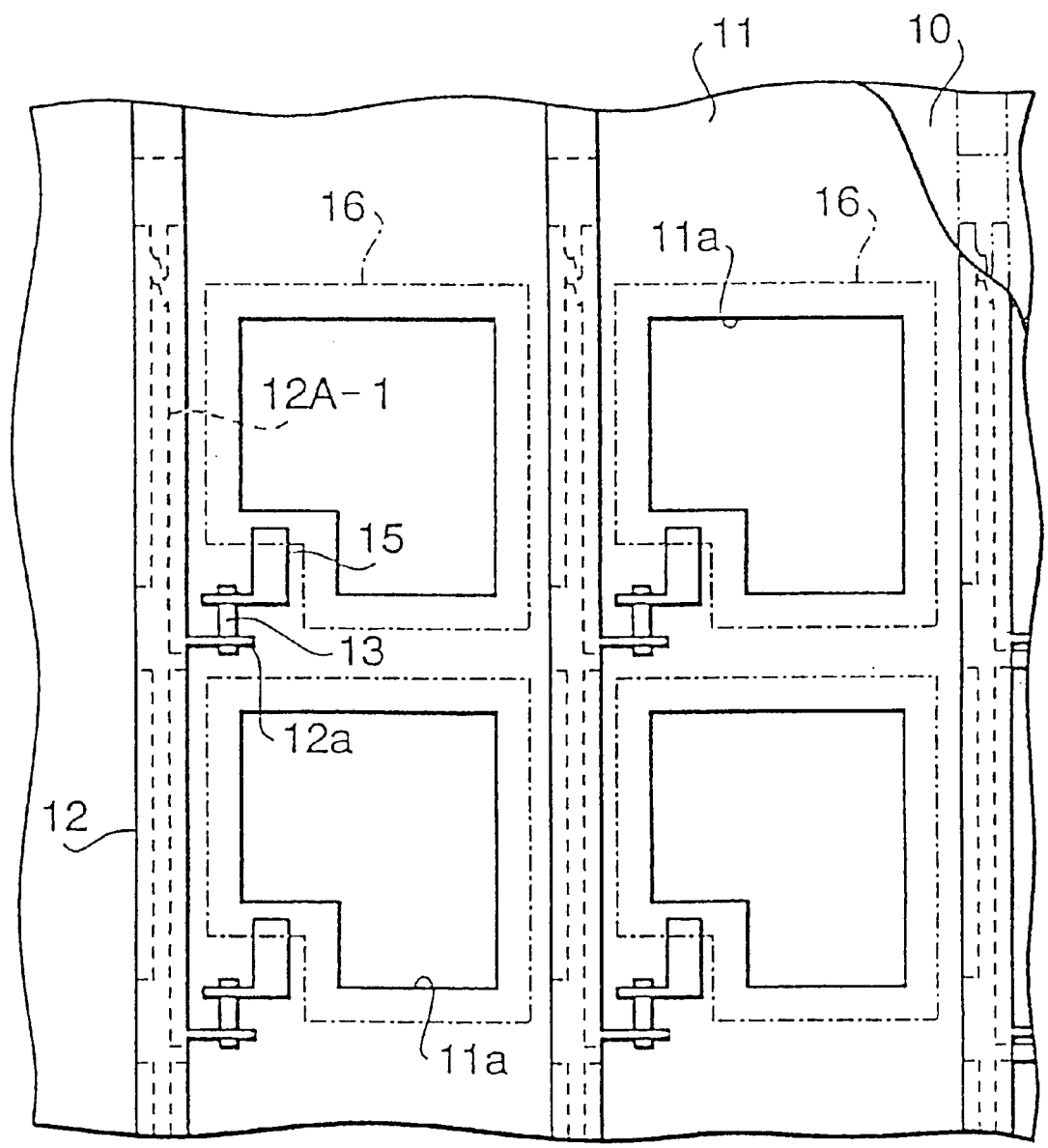
[FIG. 5]

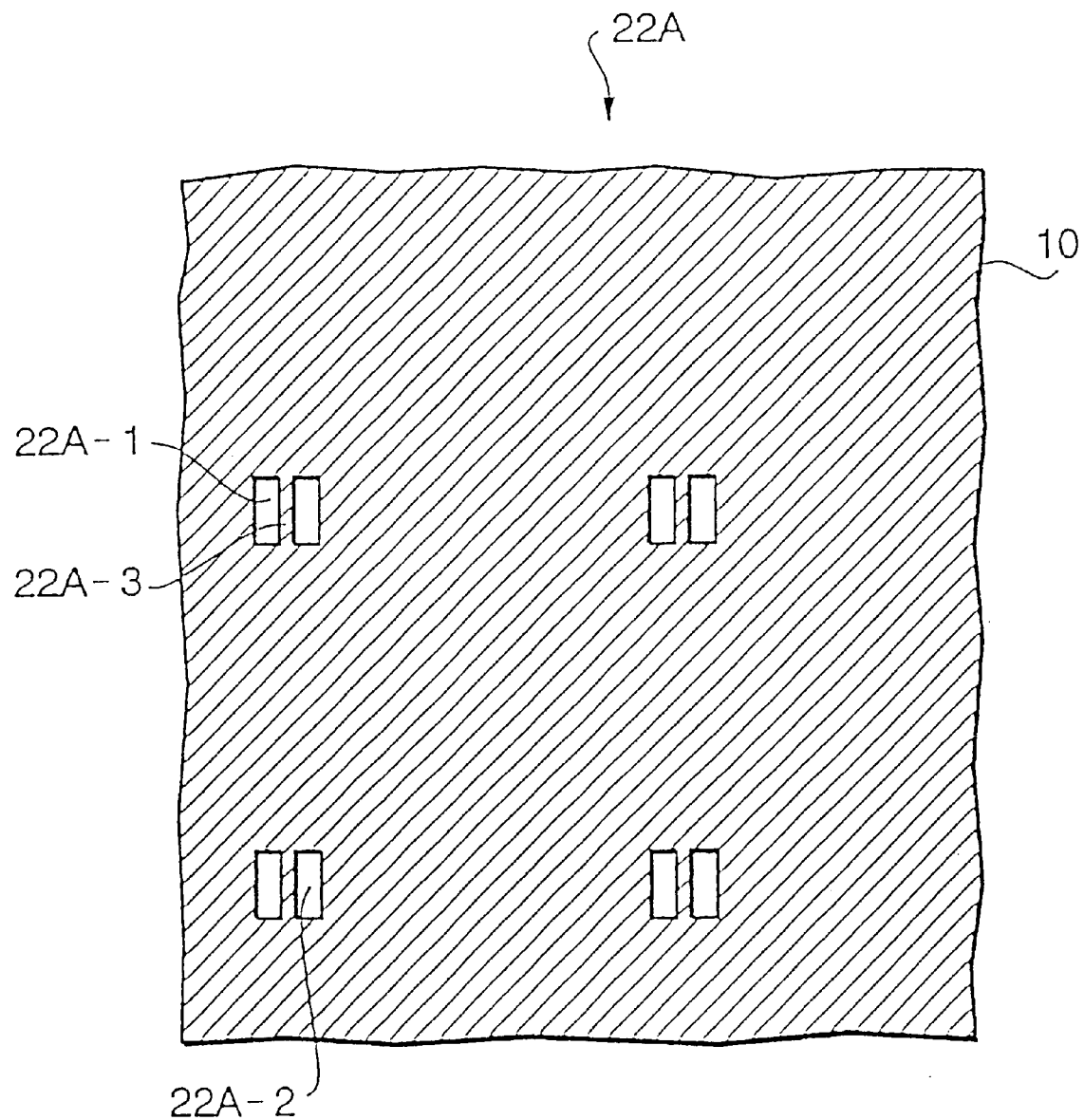
[FIG. 6]

[FIG. 7]
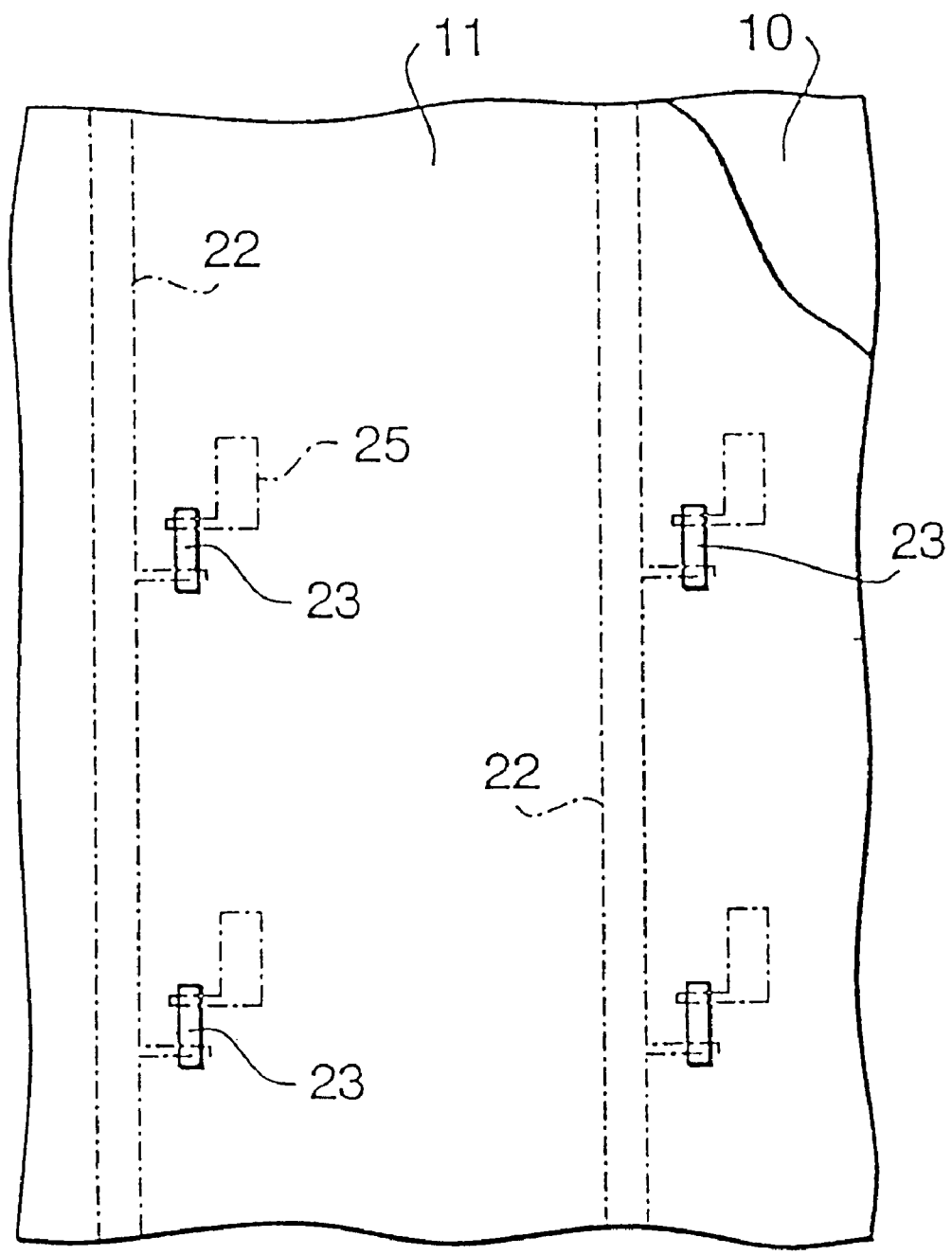

[FIG. 8]
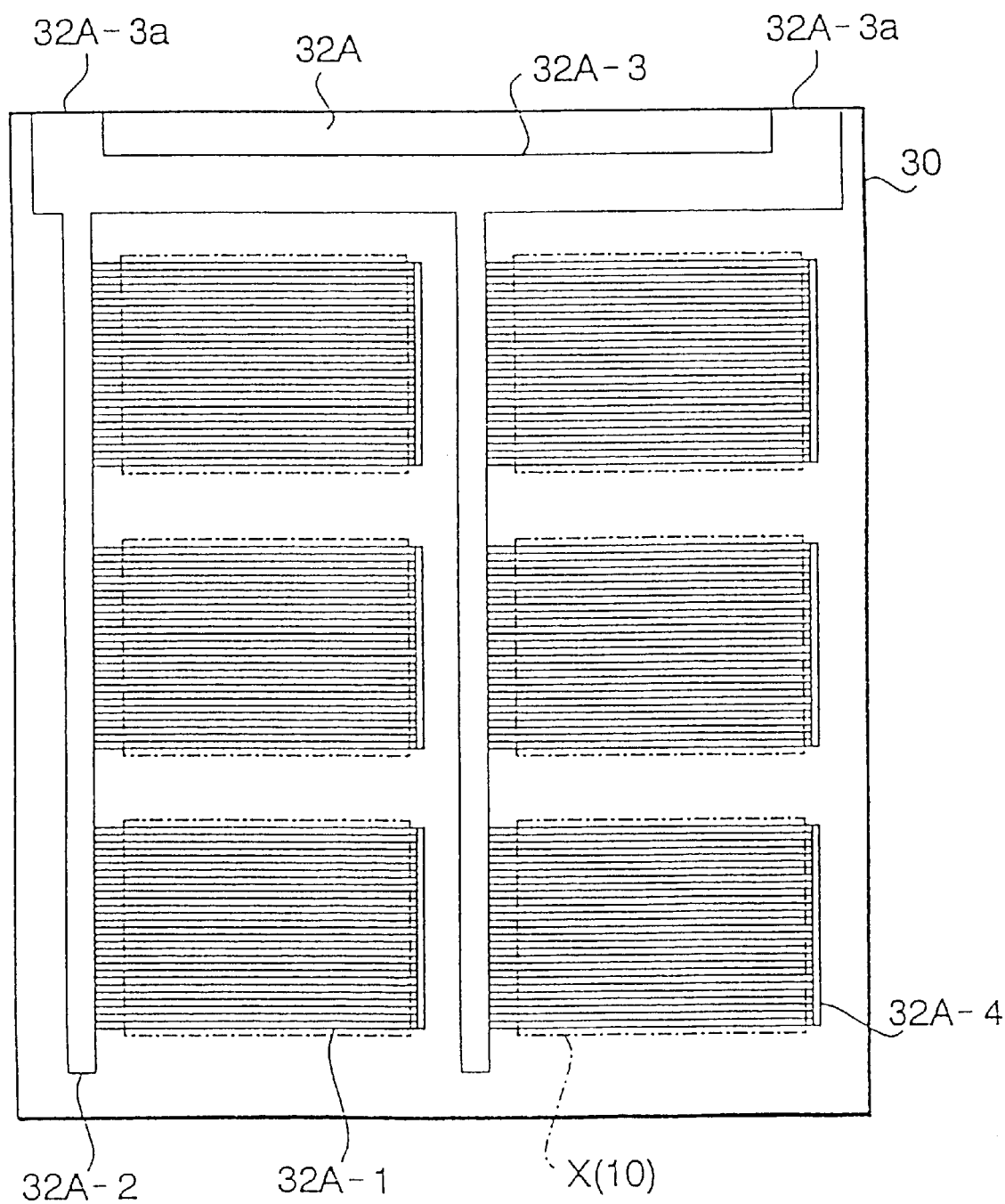

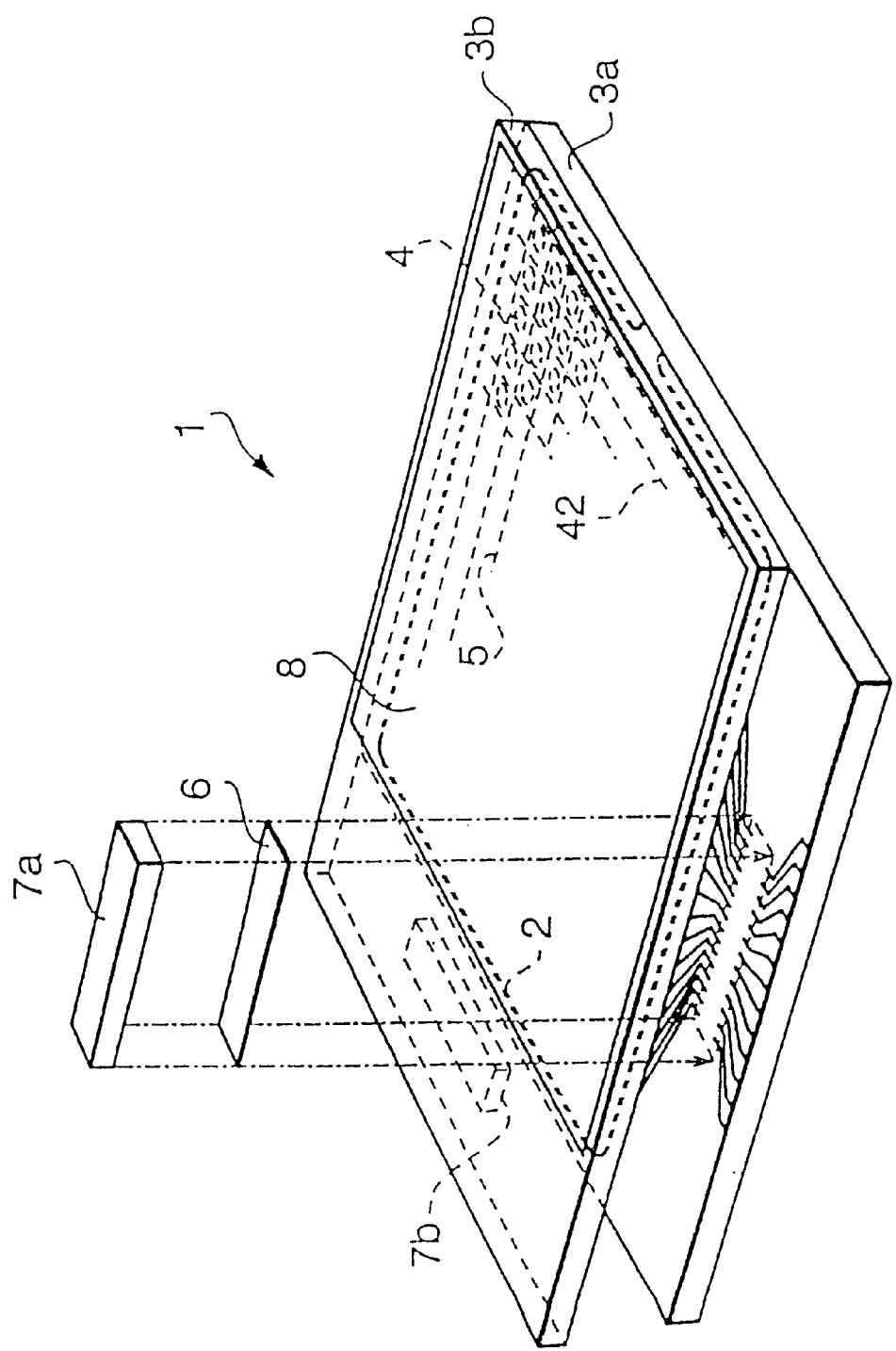
[FIG.9]

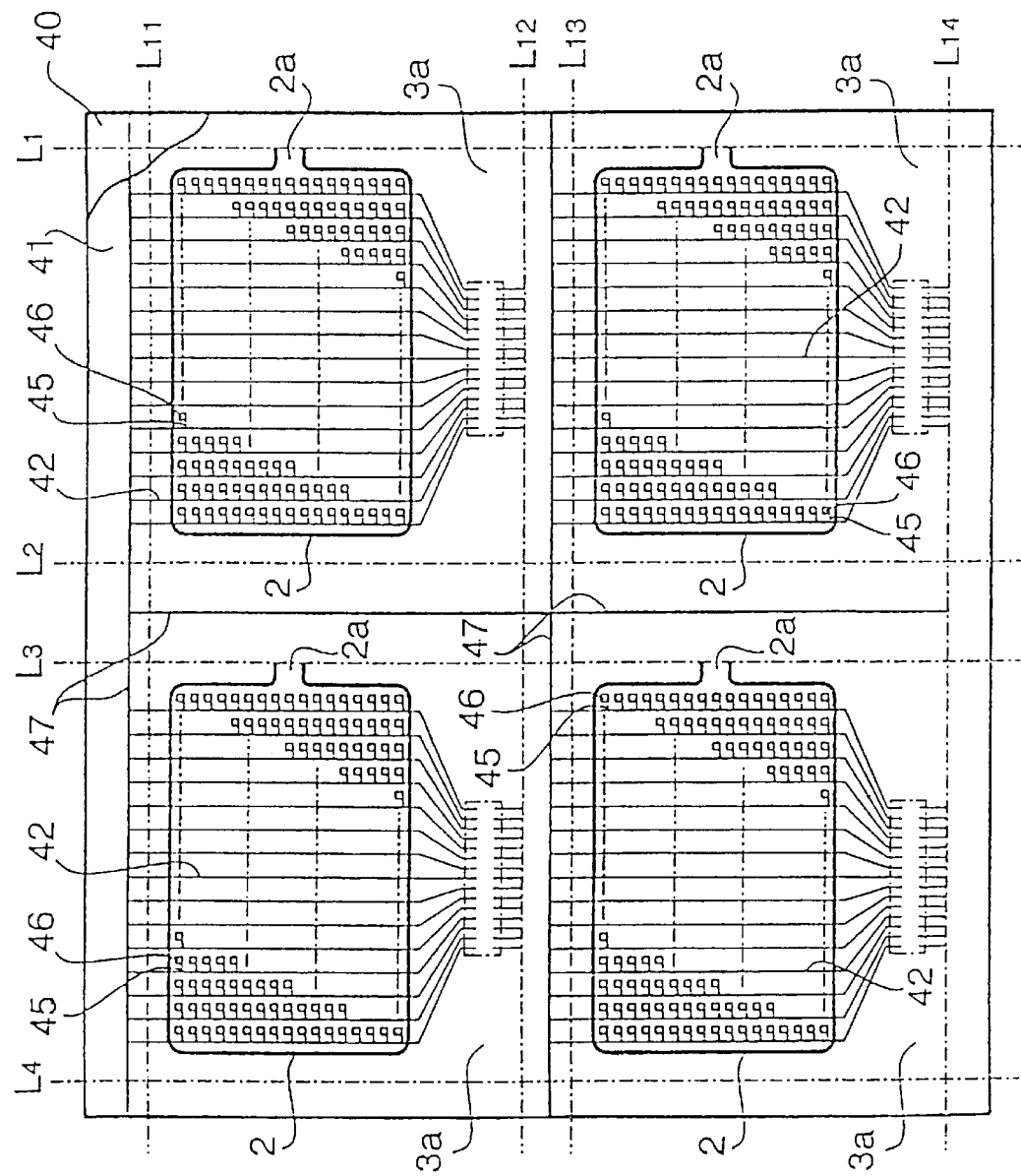

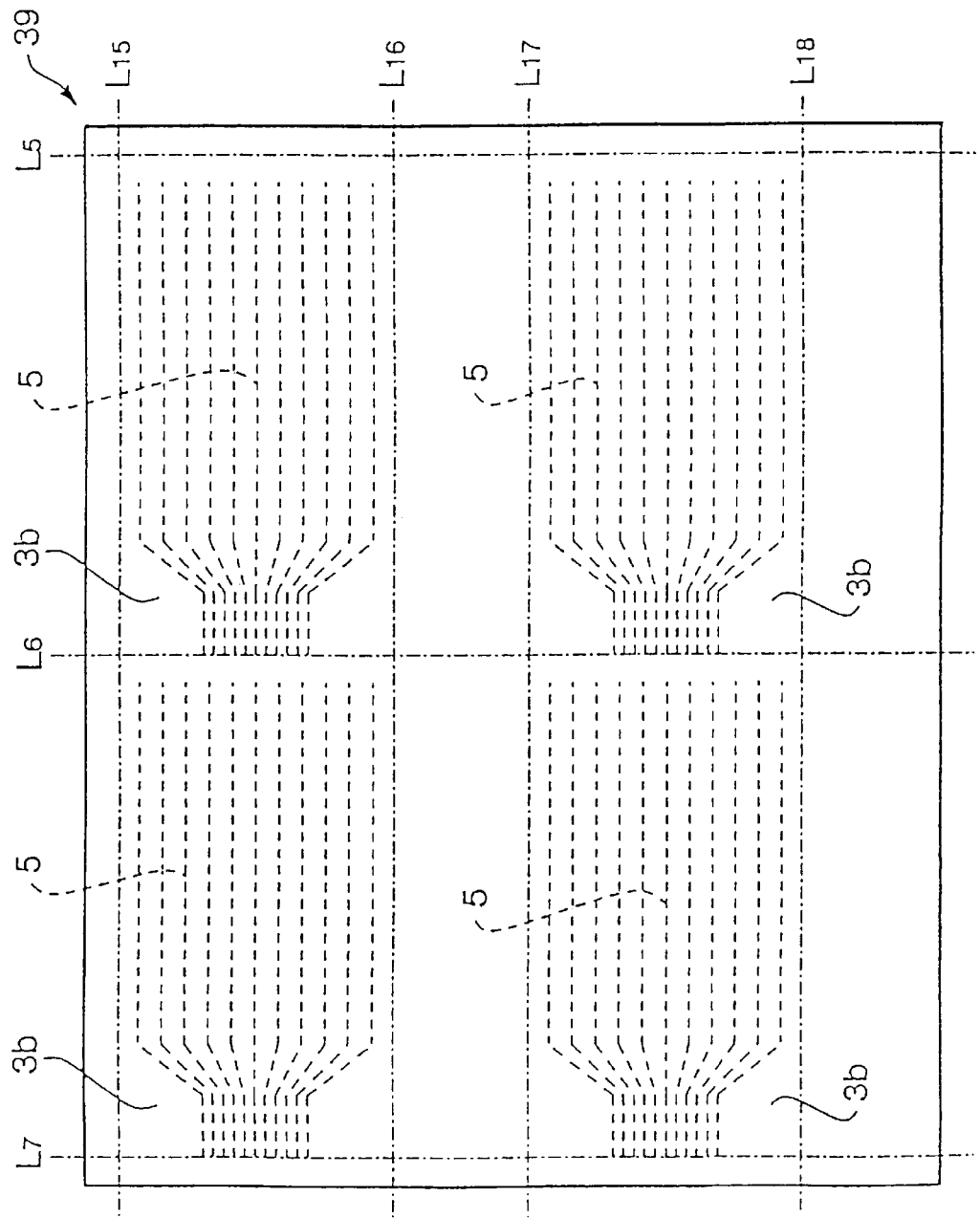
[FIG. 11]

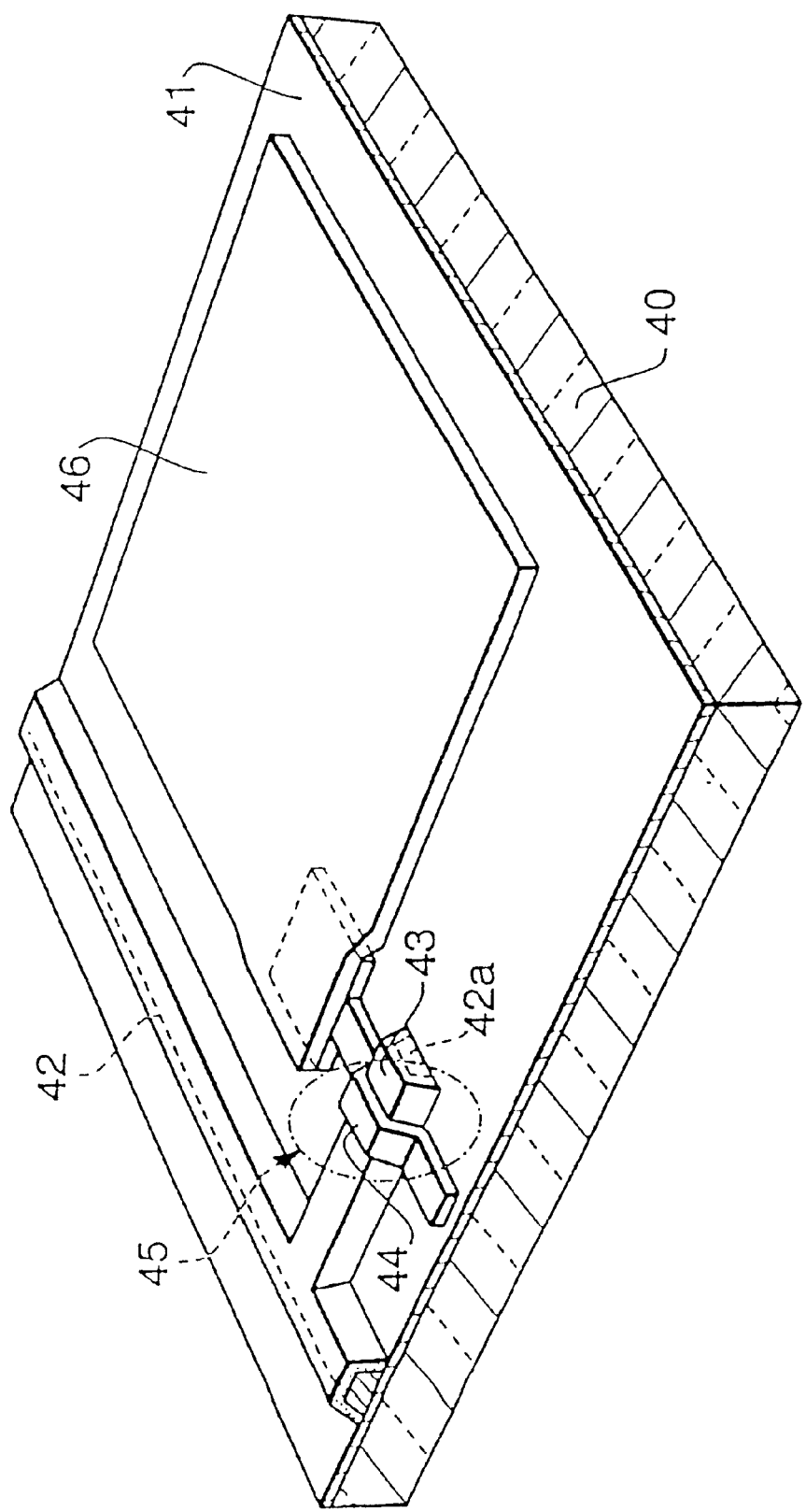
[FIG. 12]

[FIG. 13]
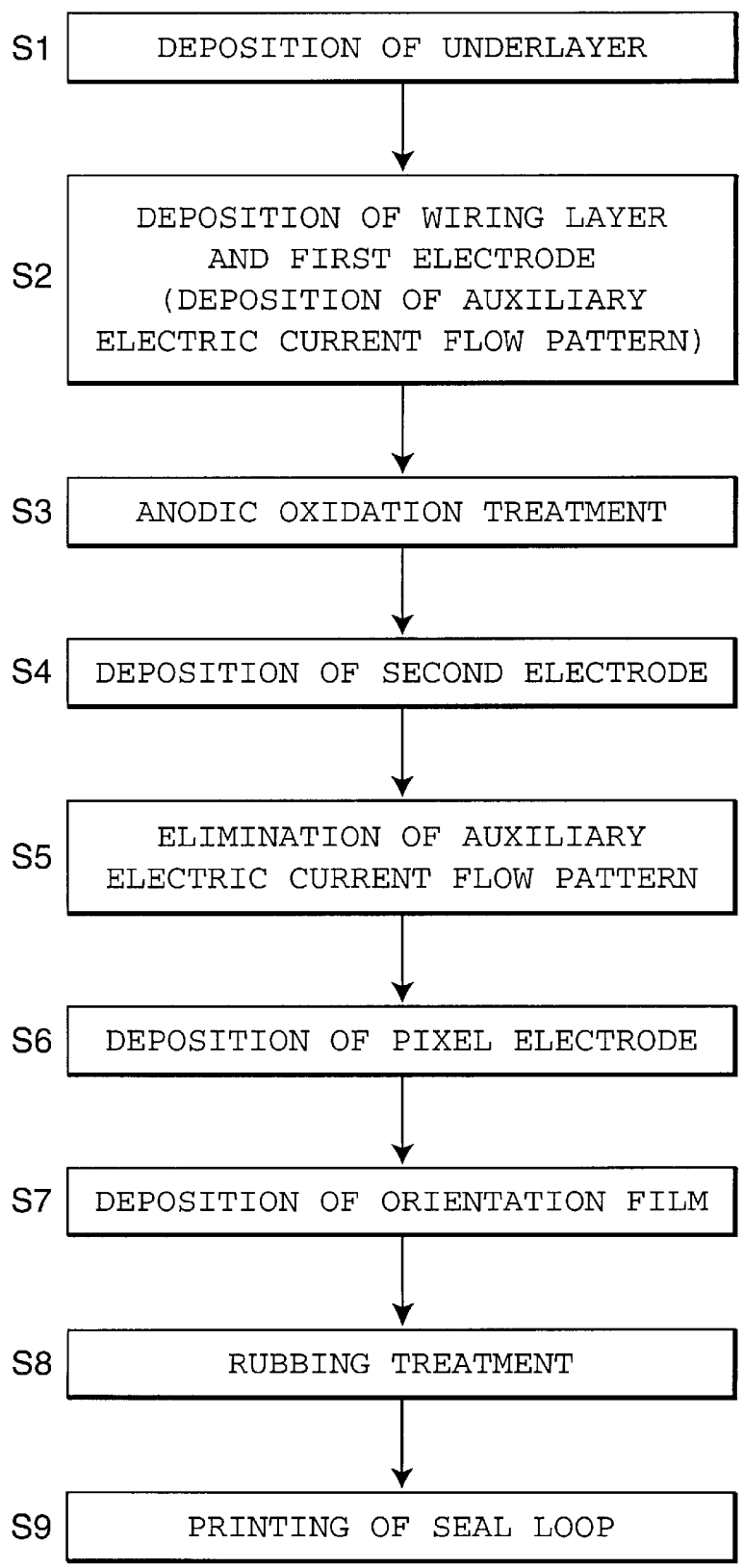

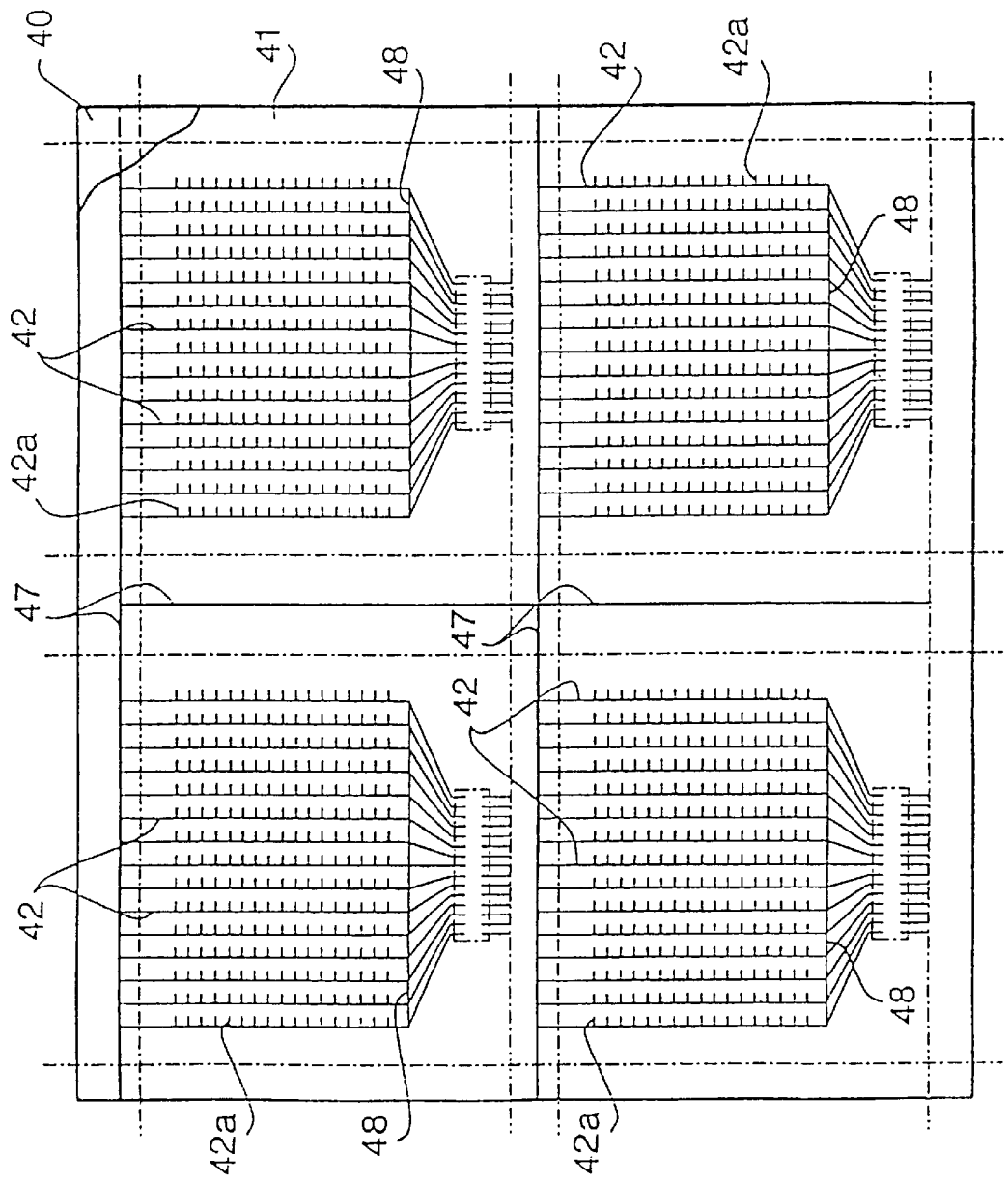
[FIG. 14]

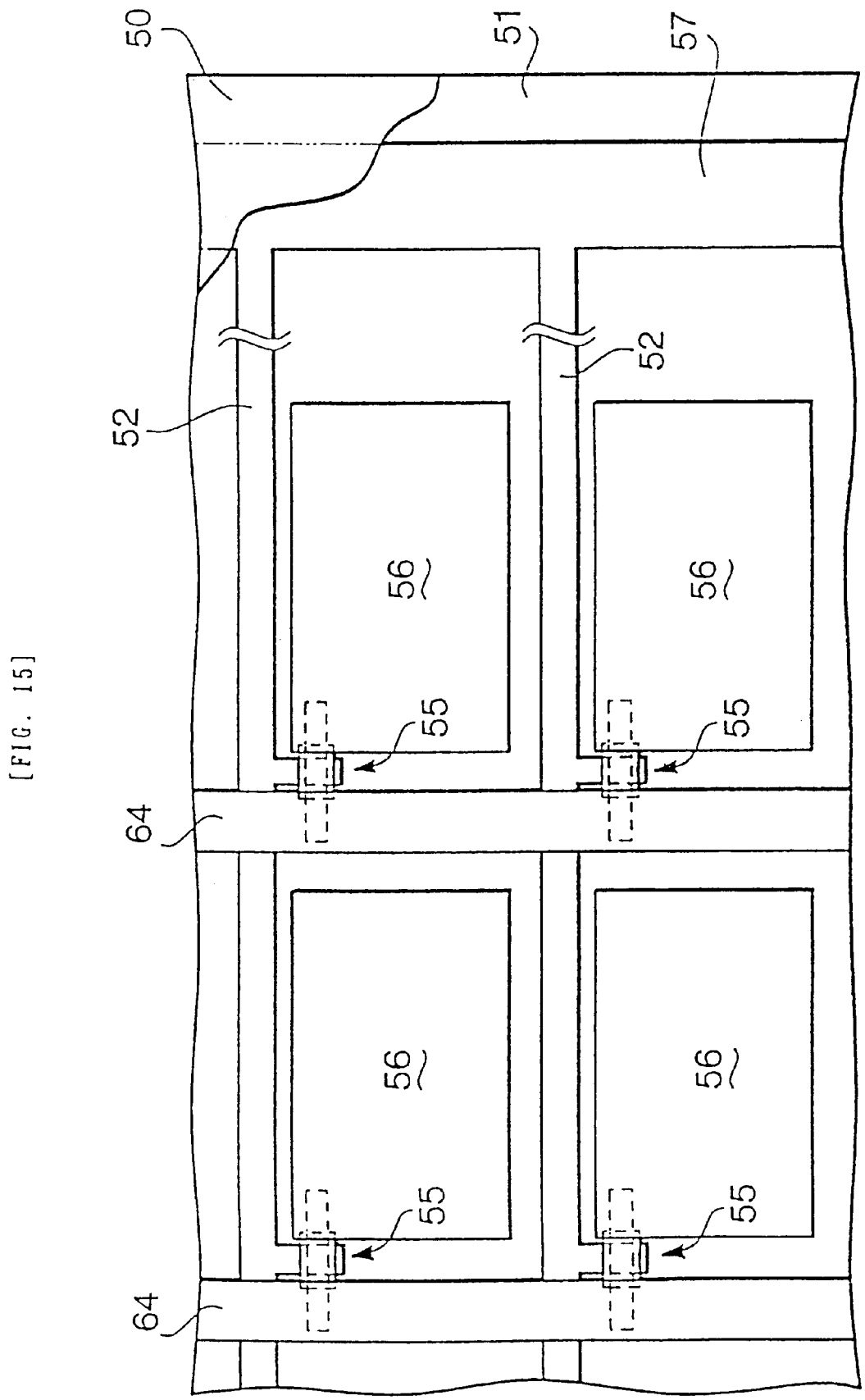
[FIG. 15]

[FIG. 16]
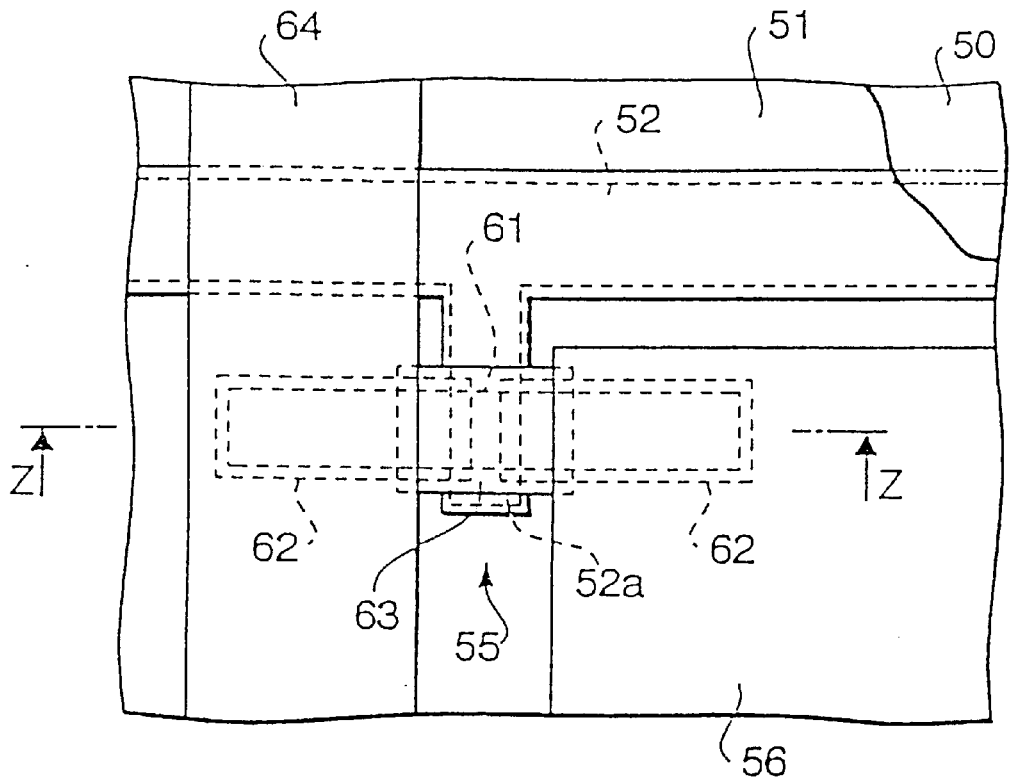
[FIG. 17]
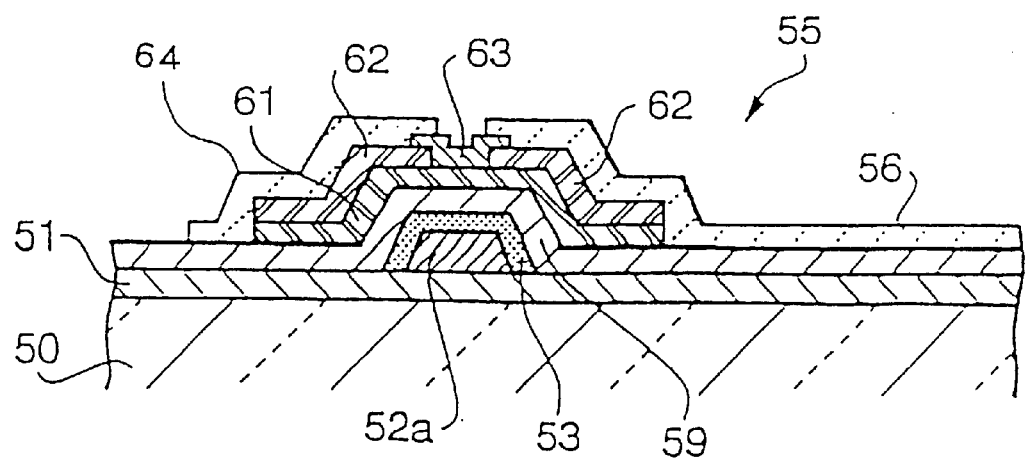

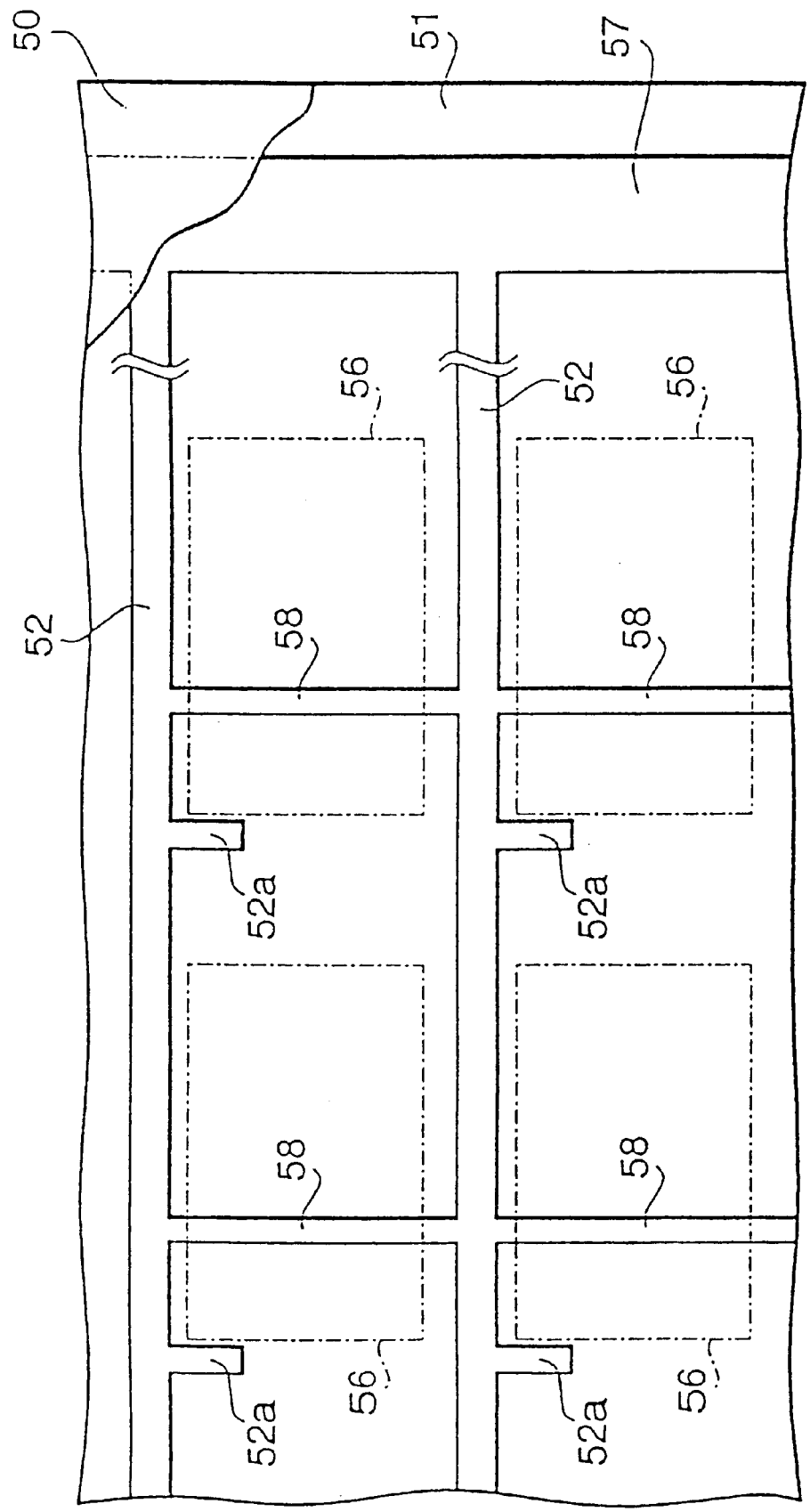
[FIG. 18]

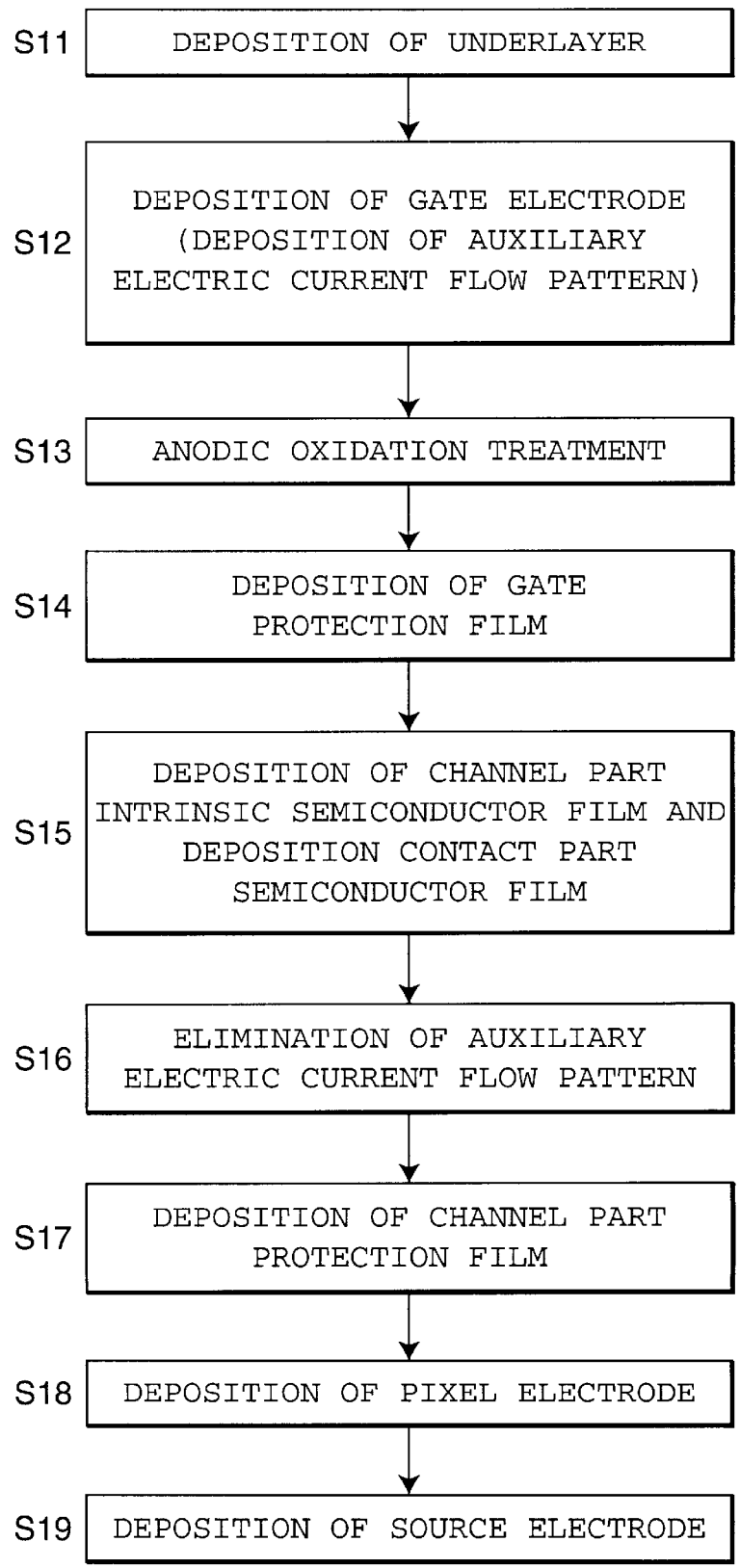
[FIG. 19]

METHOD FOR PRODUCING LIQUID CRYSTAL DEVICE WITH CONDUCTORS ARRANGED IN A MATRIX

BACKGROUND OF THE INVENTION

1. Field of the Invention

The present invention relates to a method for producing a liquid crystal device, particularly to a method for producing a liquid crystal device having active elements provided with insulation films formed by anodic oxidation.

2. Description of Related Art

Liquid crystal devices provided with active elements like elements having a non-linear voltage current characteristic, for example TFT (Thin Film Transistor) or TFD (Thin Film Diode) for each pixel are commercially available conventionally. Some of these kinds of liquid crystal devices contain active elements constructed by forming anodic oxidation films during the manufacturing process on the surface of the electrode sections to serve as insulation films.

One example of the active element described above is a diode element (referred to a MIM element hereinafter) provided with a laminated structure unit of MIM (Metal-Insulator-Metal). This MIM element is formed by forming an insulation film on the surface of a first electrode layer formed of an electric conductor by anodic oxidation followed by additionally forming a second electrode layer thereon. In this case, using the anodic oxidation for forming the insulation film allows an insulation film having a uniform thickness along with having a good reproducibility to be formed with reduced production cost. Moreover, characteristics of the element may be securely stabilized since the film quality can be readily improved by applying an annealing treatment or the like.

Examples of the method for producing the MIM element with the foregoing construction includes the following steps. An underlayer consisting of $Ta_2O_5$ is at first formed on a glass substrate in full measure followed by forming an energizing pattern including a plurality of the first electrode layers on this underlayer using Ta. This energizing pattern is in advance formed into a pattern similar to the wiring layer. An insulation film consisting of $Ta_2O_5$ is then formed on each first electrode layer formed for each pixel via the energizing pattern. In the next step, the MIM element is formed by forming the second electrode layer consisting of Cr so that the layer is partly overlapped on the insulation film or the first electrode layer. Finally, a transparent pixel electrode consisting of ITO (Indium Tin Oxide) is formed so that the electrode is electrically connected to the second electrode layer.

Meanwhile, an energizing pattern formed on the surface of the substrate for respective pixels for energizing through all the plurality of first electrode layers should be formed prior to the anodic oxidation step in the liquid crystal device provided with the conventional MIM elements as described above. The energizing pattern is formed into a pattern having the same shape as the finally formed wiring layer when this energizing pattern is used for the wiring layer while, when the energizing pattern is not directly used as the wiring layer, the pattern is formed into a pattern almost identical with the wiring layer along the region for forming the wiring layer in order to accommodate the energizing path in the element.

However, once a part of the energizing pattern is broken, no insulation layer is formed on the surface of the respective first electrodes located at the tip of the broken part, thereby causing a problem that incomplete MIM elements are formed. When a pattern having a partially defective shape, though the pattern is not broken, is formed, resistance of the feeding path is locally increased on the time of anodic oxidation to make the variation of the thickness of the insulation film or the like, non-uniform with distributed characteristics of the active elements, thereby causing a problem that the display quality is deteriorated.

On the other hand, in the energizing pattern, while a part of a plurality of stripe-shaped wiring pattern sections aligned in parallel with each other in the interior of the liquid crystal display region as the wiring layer usually has a construction in which the wiring pattern sections are joined with each other by the joint pattern sections for putting them into continuity t outside of the liquid crystal display region, this joint pattern section is usually cut off from the wiring pattern section after completing the liquid crystal cell by breaking the substrate. However, an electric impulse is imparted to a plurality of the MIM elements via the joint pattern section when, for example, the insulation layer to be formed on the uppermost layer of the element substrate is formed by sputtering before the joint pattern section is cut of, causing a problem that the MIM element is broken by the process damage during the step described above.

SUMMARY OF THE INVENTION

Accordingly, the object of the present invention is to solve the problems hitherto described, to avoid defective anodic oxidation in the method for producing the liquid crystal device even when breaking of the energizing pattern has taken place or the pattern shape becomes imperfect, along with providing a novel producing method for allowing the process damage of the MIM element to be decreased.

The present invention, carried out for solving the foregoing problems, provides a method for producing a liquid crystal device having a plurality of wiring layers, pixel electrodes formed for each pixel and active elements provided with insulation films connected between the wiring layer and the pixel electrode and being formed by anodic oxidation on electric conductors on one of the two substrates sandwiching a liquid crystal layer, providing the steps of:

forming an energizing pattern on the substrates including the electric conductor and connecting the electric conductor so as to be able to energize from a plurality of continuity paths;

forming an insulation film by anodic oxidation on the electric conductor by energizing through the energizing pattern; and eliminating a part of the energizing pattern so as to cut off at least one of the a plurality of the continuity paths in the energizing pattern.

According to the method for producing the liquid crystal device, insulation films can be formed on the electric conductors through another continuity path even when one continuity path is cut off or made to have a high resistance due to wire breakage or occurrence of imperfect shapes in a part of the energizing pattern during anodic oxidation since the energizing pattern allows an electric conductor to energize through a plurality of the continuity paths. Accordingly, defective insulation films are hardly formed and production yield of the liquid crystal device is increased, thus improving the display quality of the liquid crystal device.

It is preferable in the step for eliminating a part of the energizing pattern that the energizing pattern is eliminated so as to cut off another continuity path not belonging to the continuity paths of the energizing patterns for finally connecting the wiring layers and the active elements.

According to the method described above, the element side substrate can be constructed as usual by cutting off the another unnecessary continuity paths finally after applying anodic oxidation through the energizing pattern.

The method for producing a liquid crystal device according to the present invention comprises the step for forming an underlayer on the surface of the substrate in advance to the step for forming the energizing pattern and it is preferable in the foregoing step for eliminating a part of the energizing pattern that the underlayer is selectively eliminated in the area for forming the pixel electrodes.

According to the method described above, it is possible to improve the contrast of the liquid crystal device since light transmittance of the pixel region can be enhanced by eliminating the region for forming the pixel electrodes in the underlayer to form an opening port-ion or by making the underlayer thin in the step for eliminating a part of the energizing pattern.

It is preferable in the step for eliminating a part of the enerigizng pattern that a part of the energizing pattern is eliminated so that the electric conductors corresponding to the active elements to be connected to the mutually different wiring layers are not electrically connected with each other.

According to the production method described above, possible risks for the active elements to be subjected to electrostatic breakage during some processing steps after completion of the active elements can be reduced by eliminating the portions joining among the wiring layers.

The present invention provides a method for producing a liquid crystal device in which substrates for the respective liquid crystal devices are produced by forming a plurality of wiring layers, pixel electrodes to be disposed for each pixel and active elements being electrically connected between the wiring layer and the pixel electrode and provided with an insulation film formed by anodic oxidation of the electric conductor, on a parent material substrate provided on one of the substrates for a plurality of liquid crystal devices, followed by cutting off the parent material substrate, the production method preferably provides the steps of:

forming a first energizing pattern for electrically connecting the electric conductors on the substrate for a plurality of the liquid crystal devices with each other and a second energizing pattern for electrically connecting the electric conductors formed on the substrates of the respective liquid crystal devices with each other; and forming an insulation film by anodic oxidation on the electric conductors of a plurality of the liquid crystal devices by energizing through the energizing pattern.

According to the method of the present invention, forming the first energizing pattern for connecting among the electric conductors on the substrates of a plurality of the liquid crystal devices so as to be able to energize and the second energizing pattern for connecting among the electric conductors formed on the substrates of respective liquid crystal devices so as to be able to energize allows the second energizing pattern to energize through the electric conductors on the substrates of respective liquid crystal devices even when some abnormal wiring such as wire breaking has occurred in the first energizing pattern, thereby enabling to constantly form the active elements for use in a plurality of the liquid crystal devices.

It is preferable that the second energizing patterns are provided outside of the area for forming the pixel electrodes, followed by the step for eliminating the second energizing patterns along with providing a step for forming the pixel electrodes.

According to the method as described above, providing the second energizing pattern outside of the area for forming the pixel electrodes prevents the area for forming the pixel electrodes from being damaged in the step for eliminating the second energizing pattern. Consequently, the electric conductors on the substrates of respective liquid crystal devices are enabled to energize through the second energizing pattern while keeping the patterning accuracy of the-pixel electrodes even when some abnormal wiring such as wire breaking has occurred in the first energizing pattern, allowing the active elements of a plurality of the liquid crystal devices to be constantly formed.

BRIEF DESCRIPTION OF THE DRAWINGS

FIG. 1 an enlarged plane view showing the plane structure unit in the pixel region on the element side substrate for explaining a first embodiment of the method for producing the liquid crystal device according to the present invention.

FIG. 2 is a plane view showing the plane configuration of the energizing pattern according to the first embodiment.

FIG. 3 is a plane view showing the plane configuration of the MIM element on completion according to the first embodiment.

FIG. 4 is a plane view showing the plane configuration after eliminating the energizing pattern according to the first embodiment.

FIG. 5 is a plane view showing the plane configuration after eliminating the energizing pattern according to a modification of the first embodiment.

FIG. 6 is a plane view showing the plane configuration of the energizing pattern in the second embodiment of the method for producing the liquid crystal device according to the present invention.

FIG. 7 is a plane view of the plane configuration after eliminating the energizing pattern according to the second embodiment.

FIG. 8 is a plane view of the plane configuration of the energizing pattern in the third embodiment of the method for producing the liquid crystal device according to the present invention.

FIG. 9 is a perspective view showing one embodiment of the liquid crystal device produced by the method for producing the liquid crystal device according to the present invention.

FIG. 10 is a plane view showing cone embodiment of the parent material substrate of the element side used in producing the liquid crystal device shown in FIG. 9.

FIG. 11 is a plane view showing one embodiment of the parent material substrate of the opposing side to be adhered in opposing relation to the parent material substrate of the element side in FIG. 10.

FIG. 12 is an enlarged perspective view showing one pixel unit formed on the surface of the parent material substrate of the element side in FIG. 10.

FIG. 13 is a production process diagram showing one embodiment of the method for producing the liquid crystal device according to the present invention.

FIG. 14 is a plane view showing the parent material substrate of the element side produced by one of the intermediate steps for producing the parent material substrate of the element side shown in FIG. 10.

FIG. 15 is a partially enlarged plane view showing one embodiment of the parent material substrate of the element side produced in the intermediate step in carrying out a further different embodiment of the method for producing the liquid crystal device according to the present invention.

FIG. 16 is an enlarged plane view showing the principal part of FIG. 15.

FIG. 17 is a cross section viewed along the line Z—Z in FIG. 16.

FIG. 18 is a plane view showing the parent material substrate of the element side produced in the step before the step in FIG. 15.

FIG. 19 is a process flow diagram showing a further different embodiment of the method for producing the liquid crystal device according to the present invention, especially the process flow diagram for producing the parent material substrate of the element side shown in FIG. 15.

DETAILED DESCRIPTION OF PREFERRED EMBODIMENTS

FIG. 1 to FIG. 5 show the first embodiment of the method for producing the liquid crystal device according to the present invention. Especially, FIG. 1 shows the plane structure on an element side substrate 10 constituting the liquid crystal device formed by the present embodiment.

An underlayer 11 consisting of tantalum oxide ($Ta_2O_5$) with a thickness of about 800 to 1000 Å is formed on almost the entire surface of the element side substrate 10 composed of a transparent glass. This underlayer 11 may be formed by heat oxidation after sputtering Ta or by directly sputtering tantalum oxide.

A connection layer 13 with a thickness of about 2000 Å comprising an island of Ta is formed on the surface of the underlayer 11 for each pixel. An insulating film as thin as about 200 to 600 Å formed by anodic oxidation as will be described hereinafter is coated on the surface of the connection layer 13. A plurality of wiring layers 12 comprising linearly elongated Cr with a thickness of about 1500 Å are formed for each pixel region in parallel relation with each other, a first electrode section 12a being formed for each adjoining pixel from respective wiring layers 12. The first electrode section 12a is formed so as to make contact with the nearest surface of one end of the connection layer 13 via the insulation film.

A second electrode section 15a of the electrode layer 15 consisting of Cr is formed on the nearest surface of the other end of the connection layer 13 via the insulation film. This electrode layer 15 is simultaneously formed with the wiring layer 12. An outer periphery of a pixel electrode 16 comprising a transparent conductive film composed of ITO (Indium Tin Oxide) makes contact on a connection part 15b of the electrode layer 15 located at the opposite side of the second electrode portion 15a.

An opening part 11a where a part of the underlayer 11 has been eliminated may be formed in the region for forming the pixel electrode 16 as will be described hereinafter.

The surface of the element side substrate 10 with the construction as described above is coated with an insulation layer, if necessary, and is adhered to an opposing substrate (not shown in the drawing) via a seal material after coating to form an alignment layer. The wiring layers and pixel electrodes as well as color filters are formed on the opposing substrate, if necessary.

FIG. 2 to FIG. 4 show the production process according to the present invention. First, an energizing pattern 12A is formed by depositing Ta on the surface of the underlayer 11 by a sputtering method after forming the underlayer 11 followed by patterning by a photolithographic method or the like as shown in FIG. 2. As shown in the drawing, this energizing pattern 12A is composed of a wiring pattern section 12A-1 formed so as to be elongated along the region for forming the foregoing wiring layer 12, a connection pattern section 12A-2 for connecting the wiring pattern section in adjoining relation to each pixel region along the right and left direction in the drawing, and a stripe-shaped joint pattern section 12A-3 for mutually connecting the wiring pattern sections 12A-1 outside of the prospective liquid crystal display region (the region corresponding to the portion to be formed into the liquid crystal display region) where pixel regions are to be aligned.

An element constituting part 12A-2a including the part to be formed into the connection layer 13 is formed on the connection pattern section 12A-2. The portion to be formed into the connection layer 13 is formed into a protruding peninsula shape in this element constituting part 12A-2a.

The element side substrate 10 is then immersed in an electrolyte solution with a configuration shown in FIG. 2 and subjected to anodic oxidation on the surface of the energizing pattern 12A by applying a prescribed voltage between the electrode disposed in the electrolyte solution and the energizing pattern 12A electrically fed from outside via the joint pattern section 12A-3, thereby forming an insulation film on the surface of the energizing pattern 12A with a thickness corresponding to the impressed voltage level. The peripheral side surface of the protruding peninsula shape is also coated with the insulation film especially at the element constituting part 12A-2a.

In the next step, Cr is deposited on the energizing pattern 12A by the sputtering method and the wiring layer 12 and electrode layer 15 are formed as shown in FIG. 3 through patterning. Each of the first electrode section 12a of the wiring layer 12 and the second electrode section 15a of the electrode layer 15 are coated into a plane pattern elongated to traverse the protruding peninsula shape part of the element constituting part 12A-2a.

A mask is then formed by patterning the resist coated on the element side substrate 10 by a photolithography method or the like and the unnecessary part of the energizing pattern 12A is eliminated by etching via the mask. A dry etching method such as plasma etching or reactive ion etching is used for the etching process. The etching gas used is a mixed gas of $SF_6$ and $O_2$. The unnecessary part to be eliminated by etching is composed of the connection pattern section 12A-2 and joint pattern section 12A-3 excluding the part formed into the connection layer 13 shown in FIG. 4.

The connection layers 13 are formed into islands through this step as shown in FIG. 4, consequently completing a structure unit in which the MIM element formed by joining the first electrode section 12a of the wiring layer 12 and the connection layer 1, via the insulation layer, and MIM element formed by joining the second electrode section 15a of the electrode layer 15 and the connection layer 13 via the insulation layer, are connected in series. These two MIM elements are laminated in the order of Cr—insulation layer—Ta and Ta—insulation layer—Cr, respectively, viewed from the wiring layer 12 side, being constructed so as to mutually compensate their distortion from symmetry of the voltage-current characteristic arising from the difference of the metal species. Distortion of symmetry according to the voltage-current characteristic of the active element generates a direct current component in the driving electricity to be applied to the liquid crystal, causing residual images or burning of the liquid crystal.

The underlayer 11 may be selectively eliminated to form the opening 11a in the region where the pixel electrode 16 is to be formed along with eliminating the unnecessary portion of the energizing pattern 12A as shown in FIG. 5 in the etching step described above. This opening 11a is preferably rimmed at a little inside of the periphery of the pixel electrode 16 in order to keep adhesion of the pixel electrode 16 against the element side substrate 10.

Forming the opening 11a allows light transmittance at the pixel region to be enhanced. In forming the opening 11a, the light transmittance may be improved by partially eliminating the underlayer 11 along the direction of thickness to thin the underlayer, not by perfectly eliminating the underlayer 11. By doing so, adhesion of the pixel electrode can be enhanced as well as preventing contaminants from leaking out of the element side substrate 10 since the surface of the element side substrate 10 is not exposed.

Since the element constituting part 12A-2a is connected to adjoining two wiring pattern sections 12A-1 during anodic oxidation as shown in FIG. 2 in the present invention, an insulation film can be formed by anodic oxidation without hindrance even when any one of the wiring pattern sections 12A-1 is broken. Any one of the continuity paths is ensured so long as both sides of the connection pattern sections 12A-2 including the element constituting part 12A-2a are not broken or both sides of the wiring pattern sections 12A-1 connected to the connection pattern sections 12A-2 are not broken, enabling to form the insulation film on the element constituting part 12A-2a. Accordingly, the MIM element is prevented from being imperfectly formed.

Since the joint pattern section 12A-3 of the energizing pattern 12A has been eliminated by etching in the case shown in FIG. 4 or FIG. 5, the already formed MIM element is prevented from being broken by some causes such as electrostatic charge during the steps thereafter. For example, the MIM element may be sometimes subjected to electrostatic destruction due to impressed charges during sputtering when the insulation film is formed by sputtering on the surface of the element side substrate 10. However, the probability of occurrence of electrostatic destruction of the MIM element can be reduced because the wiring layers 12 to serve as data lines are spaced apart from each other as a result of eliminating the joint pattern section 12A-3.

(Second embodiment)

FIG. 6 and FIG. 7 show the second embodiment of the method for producing the liquid crystal device according to the present invention. In this embodiment, an energizing pattern 22A as shown in FIG. 6 by oblique lines is formed in the step for forming the energizing pattern 12A in the foregoing first embodiment. Two mutually adjoining openings 22A-1 and 22A-2 are formed in each pixel region in the thin film layer composed of Ta covering almost all the surface in this energizing pattern 22A. Narrow sections 22A-3 are formed as bridging shape between these two openings 22A-1 and 2A-2.

The underlayer is subjected to anodic oxidation as described in the first embodiment using energizing pattern 22A shown in FIG. 6. Since this energizing pattern 22A is formed on almost the entire surface of the element side substrate 10, anodic oxidation can be carried out under a uniformly distributed voltage. It is possible to cover the surface of the energizing pattern 22A with the insulation layer except the narrow portions 22P-3 where insulation films need to be formed to reduce the amount of current during anodic oxidation.

Only the element constituting part 22A-3 of the energizing pattern 22A shown in FIG. 6 is masked with a resist to subject to etching. This etching step is the same as described in the foregoing first embodiment. As shown in FIG. 7, only islands of the connection layer 23 are consequently left on the underlayer 11. This connection layer 23 is provided with an insulation film like the connection layer 13 in the first embodiment, two MIM elements connected in series being constructed by connecting the connection layer 23 to the wiring layer 22 and an electrode layer 25.

(Third embodiment)

The third embodiment of the method for producing the liquid crystal device according to the present invention will be described hereinafter referring to FIG. 8. A plurality of the prospective liquid crystal display regions X are set up in a large size substrate 30 composed of, for example, a glass in this third embodiment and a plurality of the element side substrates 10 for constructing a plurality of the liquid crystal displays can be cut off out of this large size substrate 30. The energizing patterns 32A composed of Ta as in the foregoing two embodiments are formed on the surface of the large size substrate 30.

These energizing patterns 32A contain a plurality of the wiring pattern sections 32A-1 formed in parallel relation within the prospective liquid crystal display regions X, the first joint pattern section 32A-2 to be connected to the wiring pattern sections 32A-1 outside of the left side of the prospective liquid crystal display regions X, The second joint pattern section 32A-3 to be commonly connected to the first joint pattern section 32A-2, and the third joint pattern section 32A-4 provided for each of the prospective liquid crystal display regions X and joining the wiring pattern section 32A-1 with each other.

The terminal sections 32A-3a of the second joint pattern section 32A-3 are provided at both ends of the second joint pattern section 32A-3 in the periphery of the large size substrate 30. These terminal sections 32A-3a are provided for feeding electric potential from a power source device(not shown in the drawing) for anodic oxidation.

The tips of the wiring pattern section 32A-1 are joined to the third joint pattern sections 32A-4 provided outside of the prospective liquid crystal display regions X. A lot of pixel regions arranged into a matrix as in the first and second embodiments are provided inside of the prospective liquid crystal display regions X.

The element constituting parts (not shown in the drawing) provided in each pixel region are collectively subjected to anodic oxidation in the present invention by using the energizing pattern 32A. The third joint pattern section 32A-4 for joining to respective wiring pattern sections 32A-1 at the side opposite to the first joint pattern section 32A-2 is provided on the energizing pattern 32A. Accordingly, even when the wiring pattern section 32A-1 is broken anywhere on its way, electricity can be fed to the portion beyond the broken site from the opposite direction via the third joint pattern section 32A-4, thereby preventing the defective insulation film from being produced during anodic oxidation.

At least the step for eliminating the third joint pattern section 32A-4 by etching should be provided in this embodiment when anodic oxidation has been completed. This step is carried out using the same treatment as used in the first and second embodiments. The first joint pattern section 32A-2 and the second joint pattern section 32A-3 can be simultaneously eliminated as well in this step. These procedures allow occurrence of electrostatic destruction of the MIM element-to be reduced during the steps for forming the insulation layer applied after the MIM element has been completed. Since continuity paths expanding over a wide range are lost by eliminating not all the first joint pattern section 32A-2 and the second joint pattern section 32A-3 but a part of them, the elimination process may give rise to a definite effect.

It is also possible to cut off the already completed portions of the first joint pattern section 32A-2 and the second joint pattern section 32A-3 from the liquid crystal cell in the break step, wherein the first joint pattern section 32A-2 and the second joint pattern section 32A-3 are not eliminated but left intact to cut off the large size substrate 30 for each liquid crystal display after the liquid crystal cell has been completed.

The third joint pattern section 32A-4 may be formed to make a contact throughout a plurality of the prospective liquid crystal display regions X in the energizing pattern 32A shown in FIG. B. Otherwise, one, or a plurality of the joint pattern sections may be provided within the prospective liquid crystal display regions X like in the third joint pattern section 32A-4.

(Fourth embodiment) The fourth embodiment of the method for producing the liquid crystal device according to the present invention comprises a method for producing a liquid crystal device provided with the MIM element as an active element. In advance to describing the production method, the liquid crystal device produced by the production method will be described.

FIG. 9 shows the liquid crystal device 1 whose construction includes an element side substrate 3a and a opposing substrate 3b adhered with each other with a sealing material 2 and a liquid crystal 4 sealed between the substrates.

A plurality of linear wiring layers 42 are formed on the inner surface of the element side substrate 3a while a plurality of linear opposing electrodes 5 are formed on the inner surface of the other substrate 3b. Though many strings of the wiring layers 42 and opposing electrodes 5 are formed in the practical liquid crystal device, several of them are illustrated in the drawing. While these wiring layers and the like are actually provided throughout almost the entire surface of the element side substrate 3a and opposing side substrate 3b, only a portion of them are illustrated in the drawing.

A liquid crystal driving IC 7a is packaged on the terrace of the element side substrate 3a using ACF (Anisotropic Conductive Film) 6 while the liquid crystal driving IC 7b is also packaged on the terrace of the opposing side substrate 3b. The wiring layer 42 on the element side substrate 3a is electrically connected to the liquid crystal driving IC 7a and the opposing electrode 5 on the opposing side substrate 3b is electrically connected to the liquid crystal driving IC 7b. Illustrative drawings of such connection states are omitted in the drawing.

Polarizers 8 is adhered on the outer surface of the element side substrate 3a and opposing side substrate 3b, respectively in the drawing.

FIG. 10 shows a large area element side parent material substrate 40 having an area corresponding to a plurality of the element side substrates 3a, or corresponding to four element side substrates 3a in this embodiment. FIG. 11 shows a large area opposing side parent material substrate 39 having an area corresponding to a plurality of the opposing side substrate 3b, or corresponding to four opposing side substrates 3b in this embodiment. The liquid crystal device 1 shown in FIG. 9 is produced using the parent material substrates 39 and 40 as follows.

Firstly, a large area panel structure unit is formed by adhering the element side parent material substrate 40 (FIG. 10) and opposing side parent material substrate 39 (FIG. 11) together while respective sealing materials 2 formed on the surface of the element side parent material substrate 40 remain to be sandwiched between the two parent material substrates. A liquid crystal injection hole 2a is provided at an appropriate site of each sealing material 2.

Then, scribe lines L1 to L4 are drawn with respect to the element side parent material substrate 40 and scribe lines L5 to L7 are drawn with respect to the opposing side parent material substrate 39. A medium area panel structure unit having a liquid crystal injection hole 2a exposed to outside is formed by cutting off the large area panel structure unit using these scribe lines as standards.

In the next step, the liquid crystal is injected into the panel structure unit by a method known in the art through the liquid crystal injection hole 2a exposed to the outside and, after completing injection, each liquid crystal injection hole 2a is sealed with a resin. Scribe lines L11 to L14 with respect to the element side parent material substrate 40 or scribe lines L15 to L18 with respect to the opposing side parent material substrate 39 are drawn thereafter and the medium area panel structure unit containing the liquid crystal is cut off using these scribe lines as standards. The procedure described above allows one liquid crystal device 1 shown in FIG. 9 to be obtained without being equipped with the liquid crystal driving ICs 7a and 7b, or as a so-called liquid crystal panel. The liquid crystal driving ICs 7a and 7b are packaged to this liquid crystal panel, followed by adhering the polarizer 8 on the outer surfaces of the respective element side substrate 3a and opposing side substrate 3b to complete the liquid crystal device 1.

A plurality of linear wiring layers 42 are formed in each liquid crystal area of the element side parent material substrate 40 as shown in FIG. 10, MEM (Metal Insulator Metal) elements 45 as active elements being further formed between pixel electrodes 46 and wiring layers 42 in addition to forming the pixel electrodes 46 in a matrix between these wiring layers 42. Although the actual pixel electrodes 46 and others are so tiny that it is very difficult to visually recognize them, they are enlarged in FIG. 10 to illustrate their construction for easy recognition.

The MIM element 45 is formed by laminating an anode oxidation film 43 as an insulation layer on the first electrode 42a formed so as to be protruded from the wiring layer 42 on the underlayer 41 as shown in FIG. 12, followed by laminating the second electrode 44 on the anode oxidation film 43. The method for forming the MIM element 45 as above will be described referring to the process diagram shown in FIG. 13.

With reference to FIG. 14, a element side parent material substrate 40 composed of a glass or the like is prepared and an-underlayer 41 (refer to FIG. 12) is formed by sputtering $Ta_2O_5$ on the parent material substrate with a uniform film thickness (step S1). Next, a plurality of linear wiring layers 42, the first electrodes 42a for the MIM elements protruding from the wiring layers 42 and main energizing pattern 47 connecting among the wiring layers 42 of each liquid crystal device unit are formed by patterning Ta on the underlayer 41 using a conventional patterning technique such as a photo-lithographic method. Auxiliary linear energizing pattern 48 for energizing respective wiring layers 42 is simultaneously formed within respective liquid crystal device units (step S2).

Then, the element side parent material substrate 40 is immersed into an electrolyte, or an anodic oxidation solution, followed by subjecting to anodic oxidation by applying a predetermined voltage to the main energizing pattern 47 (step S3), thereby forming an anode oxidation film on the first electrode section 42a and other patterns shown in FIG. 14.

Since the auxiliary energizing pattern 48 is formed in respective liquid crystal device section in addition to the main energizing pattern 47 and connects each wiring layer 42 by the auxiliary energizing pattern 48 in this embodiment, an electric current can be flowed into each wiring layer 42, that is, into each first electrode 42a, through this auxiliary energizing pattern 48 even when some abnormal wiring such as breaking has occurred at somewhere of the main energizing pattern 47. Therefore, the anode oxidation films 43 (refer to FIG. 12) with a proper film thickness can be constantly formed on all the first electrode 42a.

The second electrode 44 (refer to FIG. 12) is formed thereafter by patterning Cr on respective anode oxidation films 43 formed as described above using, for example, a photolithographic method (step S4). Then, the auxiliary energizing pattern 48 is eliminated in the step S5. Any film elimination processing including photoetching is available for this elimination work. Continuity of each wiring layer 42 at the side except the main energizing pattern 47 can be broken by eliminating this auxiliary energizing pattern 48.

The pixel electrodes 46 in a matrix is formed by patterning ITO (Indium Tin Oxide) so that a part of ITO film is overlapped with the second electrodes 44 forming prescribed dot configuration (step S6). Then, an alignment layer is uniformly formed on the surface of the substrate (step S7), a rubbing treatment for uniaxial alignment treatment is applied to the alignment layer (step S8) and finally a sealing material 2 is formed by screen printing or the like(step S9), thereby producing the element side parent material substrate 10 shown in FIG. 10. The works executed thereafter for producing the liquid crystal device 1 (FIG. 9) have been already described.

The auxiliary energizing pattern 48 in this embodiment is formed so as to connect the wiring layers 42 with each other in the area outside of the area for forming the MIM element 45 and pixel electrodes 46 shown in FIG. 10.

The hitherto described procedure ensures tolerance of anodic oxidation while keeping patterning accuracy of the pixel electrode, because there are no problems of forming a nonuniform underlayer 41 or the like in an area for forming the pixel electrode even after the elimination step of the auxiliary energizing pattern.
(Fifth embodiment)

The fifth embodiment for producing the liquid crystal device according to the present invention provides a method for producing the liquid crystal device provided with TFT (Thin Film Transistor) as an active element. In this production method, like the method for producing the liquid crystal device 1 shown in FIG. 9, a large area panel structure unit is formed by adhering a large area element side parent material substrate in which a plurality of element side substrates for forming respective liquid crystal devices are formed, and a large area opposing side substrate in which a plurality of opposing side substrates for forming respective liquid crystal device with each other. A liquid crystal is then sealed into each liquid crystal unit of the panel structure unit followed by cutting off the large area panel structure unit in which the liquid crystal is sealed to produce respective liquid crystal devices by a series of procedures.

FIG. 15 is an enlarged plane view of each pixel portion with respect to the large area element side parent material substrate 50 produced by this production method. As shown in the drawing, one pixel is mainly formed of one pixel electrode 56. An underlayer 51 is formed on the entire surface of the large area element side parent material substrate 50 with a uniform thickness, on which a plurality of linear gate electrode lines 52 are formed in parallel relation with each other, and a main energizing pattern 57 joining to each gate electrode line 52 is further formed thereon.

The gate electrode line 52 and pixel electrode 56 are connected with each other via a TFT element 55 as an active element as shown in FIG. 16. This TFT element 55 is formed, as shown in FIG. 17, by laminating the respective layers on the underlayer 51 in the following order, i. e. a gate electrode 52a, an anode oxidation film 53 as a gate insulation film, a nitride film 59 as an another gate insulation film, a-Si (amorphous silicon) film 61 as a channel part intrinsic semiconductor film, $N^+$a-Si (doped amorphous silicon) film 62 as a contact part semiconductor film and nitride film 63 for protecting the channel part.

A plurality of linear source electrode lines 64 are formed in parallel relation with each other to orthogonally cross with the gate electrode line 52 on the surface of the element side parent material substrate 50 as shown in FIG. 15. These source electrode lines 64 are formed so that they are laminated on one side of the $N^+$a-Si film 62 (the left side in FIG. 16) as shown in FIG. 16 and FIG. 17. The pixel electrode 56 is also formed so as to be laminated on the other side (the right side in FIG. 16) of the $N^+$a-Si film 62.

The method for forming the TFT element 55 as described above will be described hereinafter referring to the process diagram shown in FIG. 19. An element side parent material substrate 50 formed of glass or the like is prepared as shown in FIG. 18, on which an underlayer 51 is formed by sputtering $Ti_2O_5$ or the like with a uniform thickness (step S11).

Then, a plurality of linear gate electrode lines 52, gate electrodes 52a for the TFT element protruding from these gate electrode lines 52 and a main energizing pattern 57 for connecting gate electrode lines 52 of respective liquid crystal device units are formed by patterning Ta on the underlayer 51 using a conventional patterning technology such as a photolithographic method. An auxiliary energizing pattern 58 for energizing adjacent gate electrode lines 52 is simultaneously formed corresponding to respective pixel portions (step S12).

The element side parent material substrate 50 is immersed into an electrolyte, or an anodic oxidation solution, thereafter and is subjected to anodic oxidation by applying a given voltage on the main energizing pattern 57 (step S13), thereby forming an anodic oxidation film on the gate electrode 52a or other patterns.

Since an auxiliary energizing pattern 58 is formed in each pixel division in addition to the main energizing pattern 57 and respective gate electrode lines 52 are connected with each other by this auxiliary energizing pattern 58 in this embodiment, an electric current can be flowed through each auxiliary enerigizng pattern 58 to each gate electrode line 52, or to each gate electrode 52a, when some wiring faults such as breaking have occurred at somewhere of the main energizing pattern 57, thereby enabling to constantly form the anodic oxidation film 53 (refer to FIG. 17) with a proper film thickness on all the gate electrodes 52a.

A gate protection film 59 (refer to FIG. 17) is then formed by patterning $Si_2N_4$ by, for example, a CVC method on each anodic oxidation film 53 formed as described above (step S14). Furthermore, an a-Si film is deposited with a uniform thickness, a $N^+$a-Si film is deposited with a uniform thickness, a contact part semiconductor film 62 is formed by patterning the $N^+$a-Si film by photoetching or the like and a channel part intrinsic semiconductor film 61 is finally formed by patterning the a-Si film (step S15).

The auxiliary energizing pattern 58 is eliminated thereafter in the step S16. This elimination process is applied in order to remove respective layers of $Si_3N_4$, $Ta_2O_5$ and Ta that have been deposited, a dry etching technique using fluorinated gases such as $SF_6$ and $CF_4$ may be used for this process. Conduction among respective gate electrode lines 52 at the site except the main energizing pattern 57 can be broken by this elimination treatment of the auxiliary energizing pattern 58.

Next, the channel part protection film 63 is formed by patterning the $Si_3N_4$ film using a conventional patterning technique (step S17) followed by forming the pixel electrodes 56 into a matrix configuration by patterning an ITO (Indium Tin Oxide) film into a predetermined dot so that a part of the film is overlapped with the $N^+$a-Si film 62 (step S18). The source electrode lines 64 are then formed by patterning Al film so that a part of the film is overlapped with the $N^+$a-Si film 62 and the Al film strips are aligned in parallel with each other (step S19).

An alignment layer is then uniformly formed on the surface of the substrate followed by applying a uniaxial alignment treatment, a rubbing treatment for example, to the alignment layer and forming a sealing material by a screen printing method or the like to complete a prescribed treatment. A large area panel structure unit is formed in the next step by placing an opposing side parent material substrate, independently prepared from the element side parent material substrate, on the element side parent material substrate. A plurality of liquid crystal panels corresponding to each liquid crystal device are produced by cutting off the panel structure unit after sealing a liquid crystal into respective liquid crystal device units in the panel structure unit. A plurality of desired liquid crystal devices are produced by mounting a polarizer and liquid crystal driving IC or the like on each liquid crystal panel.

As hitherto described, the adjoining gate electrode lines 52 are energized with each other by the auxiliary energizing pattern 58 until the anodic oxidation treatment (step S13) has been completed according to this embodiment. Therefore, the anode oxidation film can be formed without any obstacle on all the gate electrodes 52a by using the auxiliary energizing pattern 58 even when some troubles such as breaking have occurred on the main energizing pattern 57.

INDUSTRIAL APPLICABILITY

The method for producing the liquid crystal device according to the present invention is used for producing the liquid crystal device suitable for use in a display part of portable phones, a display of computers and the like.

What is claimed is:

1. A method for producing a liquid crystal device having a plurality of wiring layers, pixel electrodes formed for each of a plurality of pixels and active elements provided with insulation films connected between the wiring layers and the pixel electrodes, the insulation films being formed by anodic oxidation on electric conductors formed on one of two substrates sandwiching a liquid crystal layer, the method comprising:

forming an energizing pattern on the substrates including the electric conductors and connecting each of the electric conductors via a plurality of continuity paths arranged in a matrix in the energizing pattern;

forming an insulation film by anodic oxidation on the electric conductors by energizing through the energizing pattern; and eliminating a part of the energizing pattern so as to cut off at least one of the plurality of the continuity paths in the energizing pattern.

2. The method for producing a liquid crystal device according to claim 1, wherein in the step of eliminating a part of the energizing pattern, the energizing pattern is eliminated so as to cut off another continuity path not belonging to the continuity paths of electric current flow patterns used to connect the wiring layers and the active elements.

3. The method for producing a liquid crystal device according to claim 1, further comprising forming an underlayer on the surface of at least one of the substrates in advance of forming the energizing pattern, and selectively eliminating the underlayer in an area for forming pixel electrodes in the step for eliminating a part of the energizing pattern.

4. The method for producing a liquid crystal device according to claim 1, wherein in the step of eliminating a part of the energizing pattern, a part of the energizing pattern is eliminated so that the electric conductors corresponding to the active elements to be connected to mutually different wiring layers are not electrically connected with each other.

5. A method for producing liquid crystal devices in which substrates for the respective liquid crystal devices are produced by forming a plirality of wiring layers, pixel electrodes to be disposed for each of a plurality of pixels and active elements being electrically connected between the wiring layers and the pixel electrodes and provided with insulation films formed by anodic oxidation on the electric conductors, on a parent material substrate provided as one of the substrates, followed by cutting off the parent material substrates, comprising:

forming a first energizing pattern for electrically connecting the electric conductors on the respective substrates for a plurality of the liquid crystal devices to each other and forming a redundant energizing pattern for electrically connecting the electric conductors formed on the respective substrates of the respective liquid crystal devices to each other; and forming an insulation film by anodic oxidation on the electric conductors of a plurality of the liquid crystal devices by energizing through the energizing patterns.

6. The method for producing a liquid crystal device according to claim 5, wherein the first and second energizing patterns are provided outside of an area for forming the pixel electrodes, further comprising eliminating the first and second energizing patterns.

7. The method for producing a liquid crystal device according to claim 5, the second energizing pattern having linearly extending portions, each of the linearly extending portions electrically connecting one end of the electric conductors of a single liquid crystal device.

8. The method for producing a liquid crystal device according to claim 7, the first energizing pattern having a linearly extending portion electrically connecting another end of the electric conductors of a plurality of liquid crystal devices, the another end of the electric conductors being opposite the one end.

9. The method for producing a liquid crystal device according to claim 8, the linearly extending portions of the first energizing pattern being substantially parallel to the linearly extending portion of the second energizing pattern.

* * * * *